United States Patent
Kondo et al.

(10) Patent No.: US 6,571,142 B1
(45) Date of Patent: May 27, 2003

(54) DATA PROCESSING APPARATUS, DATA PROCESSING METHOD, AND MEDIUM

(75) Inventors: Tetsujiro Kondo, Tokyo (JP); Kenji Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 09/597,854

(22) Filed: Jun. 20, 2000

(30) Foreign Application Priority Data

Jun. 21, 1999 (JP) .......................................... 11-174295

(51) Int. Cl.[7] .............................................. G06F 17/00
(52) U.S. Cl. ........................................ 700/90; 700/43
(58) Field of Search ............................ 700/41–43, 108, 700/90, 109, 101, 174, 173; 382/232

(56) References Cited

U.S. PATENT DOCUMENTS 4,587,620 A * 5/1986 Niimi et al. ................. 327/552
5,054,103 A * 10/1991 Yasuda et al. ................ 358/1.9
5,663,764 A * 9/1997 Kondo et al. ........... 375/240.14
5,727,085 A * 3/1998 Toyama et al. ............. 382/232

* cited by examiner

*Primary Examiner*—Leo Picard
*Assistant Examiner*—Kidest Bahta
(74) *Attorney, Agent, or Firm*—Frommer Lawrence & Haug LLP; William S. Frommer; Bruno Polito

(57) ABSTRACT

A data processing apparatus obtains a prediction coefficient used to predict first data, from second data which has a lower quality than the first data. The apparatus includes a prediction-data extracting section for extracting prediction data used to predict the first data, from the second data; a prediction-coefficient calculation section for obtaining a prediction-coefficient set used to predict the first data by using the first data and the prediction data to both of which a predetermined weight is applied; a prediction-value calculation section for obtaining the prediction value of the first data by using the prediction data and the prediction-coefficient set; a prediction-error calculation section for obtaining the prediction error of the prediction value against the first data; and a weight changing section for changing the weight applied to the first data and to the prediction data, according to the prediction error. The apparatus can obtain a prediction value having a smaller prediction error.

38 Claims, 18 Drawing Sheets

DATA PROCESSING APPARATUS, DATA PROCESSING METHOD, AND MEDIUM

BACKGROUND OF THE INVENTION

1. Field of the Invention

The present invention relates to data processing apparatuses, data processing methods, and media, and more particularly, to a data processing apparatus, a data processing method, and a medium which allow an image having a low signal-to-noise (s/n) ratio to be converted to an image having a high s/n ratio.

2. Description of the Related Art

The assignee of the present invention has already proposed class-classification adaptive processing as processing for improving the quality of an image, such as an s/n ratio and a resolution, and for improving an image.

The class-classification adaptive processing is formed of class-classification processing and adaptive processing. The class-classification processing classifies data into classes according to its characteristic and the adaptive processing is applied to each class.

In the adaptive processing, pixels (hereinafter called low-s/n pixels, if necessary) constituting a low-s/n image (an image to be processed by the class-classification adaptive processing) are linearly coupled with predetermined prediction coefficients to obtain the prediction values of the pixels of the original image, which is a high-s/n image, of the low-s/n image. With the adaptive processing, an image is obtained by removing noise from the low-s/n image, or an image is obtained by improving blur in the low-s/n image.

More specifically, for example, it is assumed that the original image (such as an image having no noise or image having no blur) is used as master data, a low-s/n image obtained by superposing noise on the original image or by adding blur thereto is used as apprentice data, and the prediction value E[y] of the pixel value "y" of a pixel (hereinafter called the original pixel, if necessary) constituting the original image is to be obtained by a linear coupling model specified by a linear coupling of a set of the pixel values $x_1$, $x_2$, . . . of several low-s/n pixels (pixels constituting the low-s/n image) and predetermined prediction coefficients $w_1$, $w_2$, . . . In this case, the prediction value E[y] is expressed by the following expression.

$$E[y] = w_1 x_1 + w_2 x_2 + \quad (1)$$

To generalize the expression (1), a matrix "W" formed of the set of the prediction coefficients "w", a matrix "X" formed of the set of the apprentice data, and a matrix "Y'" formed of the prediction values E[y] are defined in the following way.

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}$$

$$W = \begin{bmatrix} w_1 \\ w_2 \\ \cdots \\ w_n \end{bmatrix}, \quad Y' = \begin{bmatrix} E[y_1] \\ E[y_2] \\ \cdots \\ E[y_m] \end{bmatrix}$$

Then the following observation equation is derived.

$$XW = Y' \quad (2)$$

A component $x_{ij}$ of the matrix X indicates the j-th apprentice data in the i-th apprentice-data set (apprentice-data set used for predicting the i-th master data $y_i$), and a component $w_j$ in the matrix W indicates a prediction coefficient to be multiplied by the J-th apprentice data in the apprentice-data set. The i-th master data is indicated by $y_i$, and therefore, $E[y_i]$ indicates the prediction value of the i-th master data.

It is also assumed that the least squares method is applied to this observation equation to obtain a prediction value E[y] close to the pixel value "y" of the original pixel. In this case, when a matrix "Y" formed of the set of the true pixel values "y" (true values) of the original pixels serving as master data and a matrix "E" formed of the set of the remainders "e" of the prediction values E[y] against the pixel values "y" of the original pixels are defined in the following way, $$E = \begin{bmatrix} e_1 \\ e_2 \\ \cdots \\ e_m \end{bmatrix}, \quad Y = \begin{bmatrix} y_1 \\ y_2 \\ \cdots \\ y_m \end{bmatrix}$$

the following remainder equation is derived, from the equation (2).

$$XW = Y + E \quad (3)$$

In this case, the prediction coefficient $w_i$ used for obtaining the prediction value E[y] close to the pixel value "y" of the original pixel is obtained by setting the square error, $$\sum_{i=1}^{m} e_i^2$$

to the minimum.

Therefore, the prediction coefficient wi obtained when the above square error differentiated by the prediction coefficient $w_i$ is zero, in other words, the prediction coefficient $w_i$ satisfying the following expression, is the most appropriate value for a prediction value E[y] close to the pixel value "y" of the original pixel.

$$e_1 \frac{\partial e_1}{\partial w_i} + e_2 \frac{\partial e_2}{\partial w_i} + \ldots + e_m \frac{\partial e_m}{\partial w_i} = 0 \quad (i = 1, 2, \ldots, n) \quad (4)$$

The expression (3) is differentiated by the prediction coefficient $w_i$ to obtain the following expressions.

$$\frac{\partial e_i}{\partial w_1} = x_{i1}, \frac{\partial e_i}{\partial w_2} = x_{i2}, \ldots, \frac{\partial e_i}{\partial w_n} = x_{in}, \quad (i = 1, 2, \ldots, m) \quad (5)$$

From the expressions (4) and (5), the expression (6) is derived.

$$\sum_{i=1}^{m} e_i x_{i1} = 0, \sum_{i=1}^{m} e_i x_{i2} = 0, \ldots \sum_{i=1}^{m} e_i x_{in} = 0 \quad (6)$$

With the relationship among the apprentice data "x", the prediction coefficients "w", the master data "y", and the remainders "e" in the remaining equation (3) being taken into account, the following normal equations are obtained from the expression (6).

$$\begin{cases} \left(\sum_{i=1}^{m} x_{i1}x_{i1}\right)w_1 + \left(\sum_{i=1}^{m} x_{i1}x_{i2}\right)w_2 + \ldots + \left(\sum_{i=1}^{m} x_{i1}x_{in}\right)w_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \ldots + \left(\sum_{i=1}^{m} x_{i2}x_{in}\right)w_n = \left(\sum_{i=1}^{m} x_{i2}y_i\right) \\ \quad \ldots \\ \left(\sum_{i=1}^{m} x_{in}x_{i1}\right)w_1 + \left(\sum_{i=1}^{m} x_{in}x_{i2}\right)w_2 + \ldots + \left(\sum_{i=1}^{m} x_{in}x_{in}\right)w_n = \left(\sum_{i=1}^{m} x_{in}y_i\right) \end{cases} \quad (7)$$

The same number of normal equations (7) as that of prediction coefficients "w" to be obtained can be generated when a certain number of apprentice data "x" and master data "y" are prepared. Therefore, the equations (7) are solved (to solve the equations (7), it is necessary that the matrix formed of the coefficients applied to the prediction coefficients "w" be regular) to obtain the most appropriate prediction coefficients "w". It is possible to use a sweeping method (Gauss-Jordan elimination method) to solve the equations (7).

As described above, the most appropriate prediction coefficients "w" are obtained first, and then, a prediction value E[y] close to the pixel value "y" of the original pixel is obtained from the expression (1) by the use of the prediction coefficients "w." This is the adaptive processing.

The adaptive processing differs, for example, from a simple interpolation processing in that a component not included in a low-s/n image but included in the original image is reproduced. In other words, the adaptive processing is the same as interpolation processing using a so-called interpolation filter as far as the expression (1) is seen. Since the prediction coefficients "w," which correspond to the tap coefficients of the interpolation filter are obtained by learning with the use of mater data "y," a component included in the original image can be reproduced. This means that a high-s/n image can be easily obtained. From this condition, it can be said that the adaptive processing has an image creation (resolution improving) function. Therefore, the processing can be used not only for a case in which prediction values of the original image are obtained from a low-s/n image by removing noise and blur, but also for a case in which a low-resolution or standard-resolution image is converted to a high-resolution image.

FIG. 1 shows an example structure of an image processing apparatus for converting a low-s/n image to a high-s/n image by the above-described class-classification adaptive processing.

In FIG. 1, a frame memory 1 sequentially receives a low-s/n image to be processed, and temporarily stores the input low-s/n image, for example, in units of frames. The frame memory 1 stores a plurality of frames of the low-s/n image by bank switching. Even if a low-s/n moving image is input to the frame memory 1, the image can be input and output in real time by bank switching.

A class-tap generation circuit 2 sets the original pixel (the original pixel does not actually exist and is estimated) for which a prediction value is to be obtained by class-classification adaptive processing, to an aimed-at original pixel; extracts low-s/n pixels used for class classification for the aimed-at original image from the low-s/n image, stored in the frame memory 1; and outputs the extracted low-s/n pixels to a class classification circuit 4 as a class tap. More specifically, the class-tap generation circuit 2 reads some low-s/n pixels close to the aimed-at original pixel in a spatial or time manner, and outputs them to the class classification circuit 4 as a class tap.

The class classification circuit 4 classifies the aimed-at original pixel into a class according to the class tap sent from the class-tap generation circuit 2, and sends the class code corresponding to the class obtained as a result to a coefficient RAM 5 as an address. More specifically, the class classification circuit 4 applies, for example, a one-bit adaptive dynamic range coding (ADRC) to the class tap sent from the class-tap generation circuit 2, and outputs the ADRC code obtained as a result to the coefficient RAM 5 as a class code.

In K-bit ADRC processing, for example, the maximum value MAX and the minimum value MIN of the pixel values of low-s/n pixels constituting a class tap are detected; the difference therebetween, DR=MAX−MIN, is set to the local dynamic range of the set; and the low-s/n pixels constituting the class tap are re-quantized to K bits according to the dynamic range DR. More specifically, the minimum value MIN is subtracted from the pixel values of the pixels constituting the class tap, and the subtracted values are divided (quantized) by $DR/2^K$. Therefore, when one-bit ADRC processing is applied to a class tap, the pixel value of each low-s/n pixel constituting the class tap is expressed by one bit. In this case, the one-bit pixel values of the pixels constituting the class tap, obtained as described above, are arranged in a predetermined order, and the arranged bit string is output as an ADRC code.

The coefficient RAM 5 stores the prediction-coefficient set of each class, obtained by learning in a learning apparatus shown in FIG. 2. When a class code is sent from the class classification circuit 4, the coefficient RAM 5 reads the prediction-coefficient set stored at the address corresponding to the class code and sends it to a prediction calculation circuit 6.

On the other hand, a prediction-tap generation circuit 3 extracts the low-s/n pixels used for obtaining the prediction value of the aimed-at original pixel in the prediction calculation circuit 6 from the low-s/n image stored in the frame memory 1, and sends the extracted low-s/n pixels to the prediction calculation circuit 6 as a prediction tap. In other words, the prediction-tap generation circuit 3 generates a prediction tap having the same structure, for example, as a class tap for the aimed-at original pixel, and outputs it to the prediction calculation circuit 6.

The prediction calculation circuit 6 uses the set of prediction coefficients $w_1, w_2, \ldots$ for the class of the aimed-at pixel, sent from the coefficient RAM 5, and the pixel values $x_1, x_2, \ldots$ of the pixels constituting the prediction tap sent from the prediction-tap generation circuit 3 to calculate the expression (1) to obtain the prediction value E[y] of the aimed-at original pixel "y," and outputs the prediction value E[y] as the pixel value of a high-s/n pixel which is improved in s/n from a low-s/n pixel.

FIG. 2 shows an example structure of a learning apparatus for obtaining the prediction-coefficient set of each class, to be stored in the coefficient RAM 5.

The original image (for example, a high-s/n moving image) serving as master data is sent to the learning apparatus in units of frames. The original image is sequentially stored in a frame memory 11 having the same structure as the frame memory 1 shown in FIG. 1. The high-s/n image, which is the original image stored in the frame memory 11, is sent to a downconverter 12, and the downconverter 12, for example, reduces the resolution or adds noise to make a low-s/n image.

The low-s/n image obtained by the downconverter 12 is sequentially sent and stored as apprentice data by a frame memory 13 having the same structure as the frame memory 1 shown in FIG. 1.

When the low-s/n images corresponding to all the original images prepared for learning processing are stored in the frame memory 13 as described above, a class-tap generation circuit 14 and a prediction-tap generation circuit 15 read low-s/n pixels constituting a class tap and a prediction tap, respectively, of the aimed-at original pixel for which a prediction value is to be obtained, from the frame memory 13 to form the class tap and the prediction tap, respectively, in the same way as for the class-tap generation circuit 2 and the prediction-tap generation circuit 3 shown in FIG. 1. The class tap is sent to a class classification circuit 16. The prediction tap is sent to adders 17 and 19.

The class classification circuit 16 classifies the aimed at original pixel into a class by using the class tap sent from the class-tap generation circuit 14, and sends the class code obtained by the result of class classification to a prediction-tap memory 18 and to a master-data memory 20 as addresses.

The adders 17 and 19 perform the additions of prediction taps (apprentice data) and the master data.

The prediction-tap memory 18 reads the value stored at the address corresponding to the class code output from the class classification circuit 16 and sends it to the adder 17. The adder 17 uses the stored value sent from the prediction-tap memory 18 and the low-s/n pixels constituting the prediction tap, sent from the prediction-tap generation circuit 15, to calculate summation components, serving as the multiplication factors of the prediction coefficients, at the left sides of the normal equations (7). The adder 17 stores the calculation results at the address corresponding to the class code output from the class classification circuit 16 in the prediction-tap memory 18 in an overwrite manner.

The master-data memory 20 reads the value stored at the address corresponding to the class code output from the class classification circuit 16 and sends it to the adder 19. The adder 19 reads the aimed-at original image from the frame memory 11, and uses the aimed-at original pixel, the low-s/n pixels constituting the prediction tap, sent from the prediction-tap generation circuit 15, and the stored value sent from the master-data memory 20 to calculate summation components at the right sides of the normal equations (7). The adder 19 stores the calculation results at the address corresponding to the class code output from the class classification circuit 16 in the master-data memory 20 in an overwrite manner.

The adders 17 and 19 also perform multiplications shown in the equations (7). More specifically, the adder 17 executes multiplications between the low-s/n pixels "x" constituting the prediction tap. The adder 19 executes multiplications between the low-s/n pixels "x" constituting the prediction tap and the master data (aimed-at original pixel) "y."

In the learning apparatus, the above-described processing is performed with all the original pixels stored in the frame memory 11 being sequentially set to aimed-at pixels.

When the above-described processing has been finished for all the original pixels, a calculation circuit 21 sequentially reads the stored values stored at the address corresponding to each class code from the prediction-tap memory 18 and the master-data memory 20, generates the normal equations (7), and solve the equations to obtain the prediction-coefficient set of each class.

It may be possible in the above-described prediction-coefficient learning processing that the number of normal equations required for obtaining prediction coefficients cannot be obtained in some classes. Default prediction coefficients can be output for such classes. Alternatively, prediction coefficients may be output which are obtained by solving normal equations generated by the additions without classification in the adders 17 and 19 with all the original pixels being set to aimed-at original pixels.

FIG. 3 shows an example structure of an image transfer apparatus which uses the above-described class-classification adaptive processing.

In this image transfer apparatus, an encoder 31 encodes a high-s/n image to generate encoded data, and a decoder 41 decodes the encoded data to produce the original high-s/n image (prediction value thereof).

The encoder 31 is formed of a downconverter 32. A high-s/n image (either moving or still digital image data) to be encoded is input to the downconverter 32. The downconverter 32 applies filtering by using a low-pass filter (LPF) and other processing to the input high-s/n image to convert it to a low-s/n image. This low-s/n image is output as encoded data, and is transferred, for example, through a satellite line, the Internet, and a transfer medium 51 such as a terrestrial wave, or is recorded into a recording medium 52, such as an optical disk, a magneto-optical disk, a magnetic disk, magnetic tape, an optical card, and a semiconductor memory.

The low-s/n image, which is the encoded data transferred through the transfer medium 51 or reproduced from the recording medium 52, is sent to a decoder 41. The decoder 41 is formed of a class-classification adaptive processing circuit 42. The class-classification adaptive processing circuit 42 has the same structure as the image processing apparatus shown in FIG. 1. Therefore, the class-classification adaptive processing circuit 42 applies the same class-classification adaptive processing as in the case shown in FIG. 1 to the low-s/n image, serving as the input encoded data, to convert it to a high-s/n image, and outputs the image.

In the learning apparatus shown in FIG. 2, the class classification circuit 16 applies the ADRC processing to the class tap to classify the aimed-at original pixel, and then normal equations are formed for each class to obtain a prediction-coefficient set for each class.

In other words, the learning apparatus obtains a prediction-coefficient set which minimizes the sum of the squares of prediction errors (errors of prediction values against the original pixel value) in a prediction tap generated for the original pixel. As a result, a prediction-coefficient set which minimizes the prediction error of each original pixel classified into a class is not obtained, but a prediction-coefficient set which minimizes the sum of the prediction errors is obtained. Therefore, when a prediction value is obtained by the use of the prediction-coefficient set corresponding to the class into which a certain original pixel is classified in the image processing apparatus shown in FIG. 1, the prediction value may have a very small prediction error (or no prediction error), or the prediction value may have not a small prediction error.

Consequently, to calculate a prediction-coefficient set for each class obtained by the above-described class classification is not necessarily a good method for calculating the most appropriate prediction-coefficient sets used to convert a low-s/n image to a high-s/n image.

SUMMARY OF THE INVENTION

Accordingly, it is an object of the present invention to provide a data processing apparatus, a data processing method, and a medium which remedy the foregoing drawback.

The foregoing object is achieved in one aspect of the present invention through the provision of a data processing apparatus for obtaining a prediction coefficient used to predict first data, from second data which has a lower quality than the first data, including prediction-data extracting means for extracting prediction data used to predict the first data, from the second data; prediction-coefficient calculation means for obtaining a prediction-coefficient set used to predict the first data by using the first data and the prediction data to both of which a predetermined weight is applied; prediction-value calculation means for obtaining the prediction value of the first data by using the prediction data and the prediction-coefficient set; prediction-error calculation means for obtaining the prediction error of the prediction value against the first data; and weight changing means for changing the weight applied to the first data and to the prediction data, according to the prediction error.

The foregoing object is achieved in another aspect of the present invention through the provision of a data processing apparatus for processing second data which has a lower quality than first data to obtain the prediction value of the first data, including prediction-data extracting means for extracting prediction data used to predict the first data, from the second data; identification-information storage means for relating identification information used to identify a prediction-coefficient set used to predict the first data, to third data and for storing them; comparison-data extracting means for extracting comparison data to be compared with the third data stored in said identification-information storage means, from the second data; retrieving means for comparing the comparison data with the third data stored in said identification-information storage means to search for third data having the pattern same as or similar to the comparison data; and prediction-value calculation means for obtaining the prediction value of the first data by using the prediction data and the prediction-coefficient set identified by the identification information corresponding to the third data having the pattern same as or similar to the comparison data.

The foregoing object is achieved in still another aspect of the present invention through the provision of a data processing apparatus for processing first data to output second data, including prediction-data extracting means for extracting prediction data used to predict the first data, from the second data; prediction-coefficient storage means for storing a plurality of prediction-coefficient sets used to predict the first data; prediction-value calculation means for obtaining the prediction value of the first data by using the prediction data and a predetermined set of the plurality of prediction-coefficient sets; prediction-error calculation means for obtaining the prediction error of the prediction value against the first data; detecting means for detecting a set of the plurality of prediction-coefficient sets, which minimizes the prediction error; identification-information storage means for storing identification information used to identify the set of the plurality of prediction-coefficient sets, which minimizes the prediction error; and output means for outputting the identification information together with the second data.

The foregoing object is achieved in yet another aspect of the present invention through the provision of a data processing apparatus for processing second data which has a lower quality than first data to obtain the prediction value of the first data, including separation means for separating the second data and identification information used to identify each of a plurality of prediction-coefficient sets, in input data; prediction-data extracting means for extracting prediction data used to predict the first data, from the second data; and prediction-value calculation means for obtaining the prediction value of the first data by using the prediction data and the set of the plurality of prediction-coefficient sets, selected according to one piece of the identification information.

The foregoing object is achieved in yet still another aspect of the present invention through the provision of a data processing apparatus including a first unit for processing first data to output second data; and a second unit for processing the second data to obtain the prediction value of the first data, wherein the first unit includes first prediction-data extracting means for extracting prediction data used to predict the first data, from the second data; prediction-coefficient storage means for storing a plurality of prediction-coefficient sets used to predict the first data; first prediction-value calculation means for obtaining the prediction value of the first data by using the prediction data and a predetermined set of the plurality of prediction-coefficient sets; prediction-error calculation means for obtaining the prediction error of the prediction value against the first data; detecting means for detecting a set of the plurality of prediction-coefficient sets, which minimizes the prediction error; identification-information storage means for storing identification information used to identify the set of the plurality of prediction-coefficient sets, which minimizes the prediction error; and output means for outputting the identification information together with the second data, and the second unit includes separation means for separating the second data and identification information used to identify each of the plurality of prediction-coefficient sets, in input data; second prediction-data extracting means for extracting prediction data used to predict the first data, from the second data; and second prediction-value calculation means for obtaining the prediction value of the first data by using the prediction data and the set of the plurality of prediction-coefficient sets, selected according to the identification information.

The foregoing object is achieved in a further aspect of the present invention through the provision of a data processing method for obtaining a prediction coefficient used to predict first data, from second data which has a lower quality than the first data, including a step of extracting prediction data used to predict the first data, from the second data; a step of obtaining a prediction-coefficient set used to predict the first data by using the first data and the prediction data to both of which a predetermined weight is applied; a step of obtaining the prediction value of the first data by using the prediction data and the prediction-coefficient set; a step of obtaining the prediction error of the prediction value against the first data; and a step of changing the weight applied to the first data and to the prediction data, according to the prediction error.

The foregoing object is achieved in a still further aspect of the present invention through the provision of a data processing method for processing second data which has a lower quality than first data to obtain the prediction value of the first data, including a step of extracting prediction data used to predict the first data, from the second data; a step of relating identification information used to identify a prediction-coefficient set used to predict the first data, to third data and of storing them; a step of extracting comparison data to be compared with the stored third data, from the second data; a step of comparing the comparison data with the stored third data to search for third data having the pattern same as or similar to the comparison data; and a step of obtaining the prediction value of the first data by using the prediction data and the prediction-coefficient set identified by the identification information corresponding to the third data having the pattern same as or similar to the comparison data.

The foregoing object is achieved in a yet further aspect of the present invention through the provision of a data processing method for processing first data to output second data, including a step of extracting prediction data used to predict the first data, from the second data; a step of storing a plurality of prediction-coefficient sets used to predict the first data; a step of obtaining the prediction value of the first data by using the prediction data and a predetermined set of the plurality of prediction-coefficient sets; a step of obtaining the prediction error of the prediction value against the first data; a step of detecting a set of the plurality of prediction-coefficient sets, which minimizes the prediction error; a step of storing identification information used to identify the set of the plurality of prediction-coefficient sets, which minimizes the prediction error; and a step of outputting the identification information together with the second data.

The foregoing object is achieved in a yet still further aspect of the present invention through the provision of a data processing method for processing second data which has a lower quality than first data to obtain the prediction value of the first data, including a step of separating the second data and identification information used to identify each of a plurality of prediction-coefficient sets, in input data; a step of extracting prediction data used to predict the first data, from the second data; and a step of obtaining the prediction value of the first data by using the prediction data and the set of the plurality of prediction-coefficient sets, selected according to one piece of the identification information.

The foregoing object is achieved in an additional aspect of the present invention through the provision of a medium for storing a program which obtains a prediction coefficient used to predict first data, from second data which has a lower quality than the first data, the program including a step of extracting prediction data used to predict the first data, from the second data; a step of obtaining a prediction-coefficient set used to predict the first data by using the first data and the prediction data to both of which a predetermined weight is applied; a step of obtaining the prediction value of the first data by using the prediction data and the prediction-coefficient set; a step of obtaining the prediction error of the prediction value against the first data; and a step of changing the weight applied to the first data and to the prediction data, according to the prediction error.

The foregoing object is achieved in a still additional aspect of the present invention through the provision of a medium for storing a program which processes second data which has a lower quality than first data to obtain the prediction value of the first data, the program including a step of extracting prediction data used to predict the first data, from the second data; a step of relating identification information used to identify a prediction-coefficient set used to predict the first data, to third data and of storing them; a step of extracting comparison data to be compared with the stored third data, from the second data; a step of comparing the comparison data with the stored third data to search for third data having the pattern same as or similar to the comparison data; and a step of obtaining the prediction value of the first data by using the prediction data and the prediction-coefficient set identified by the identification information corresponding to the third data having the pattern same as or similar to the comparison data.

The foregoing object is achieved in a yet additional aspect of the present invention through the provision of a medium for storing a program which processes first data to output second data, the program including a step of extracting prediction data used to predict the first data, from the second data; a step of storing a plurality of prediction-coefficient sets used to predict the first data; a step of obtaining the prediction value of the first data by using the prediction data and a predetermined set of the plurality of prediction-coefficient sets; a step of obtaining the prediction error of the prediction value against the first data; a step of detecting a set of the plurality of prediction-coefficient sets, which minimizes the prediction error; a step of storing identification information used to identify the set of the plurality of prediction-coefficient sets, which minimizes the prediction error; and a step of outputting the identification information together with the second data.

The foregoing object is achieved in a yet still additional aspect of the present invention through the provision of a medium for storing a program which processes second data which has a lower quality than first data to obtain the prediction value of the first data, the program including a step of separating the second data and identification information used to identify each of a plurality of prediction-coefficient sets, in input data; a step of extracting prediction data used to predict the first data, from the second data; and a step of obtaining the prediction value of the first data by using the prediction data and the set of the plurality of prediction-coefficient sets, selected according to one piece of the identification information.

DESCRIPTION OF THE PREFERRED EMBODIMENTS

Figure 3:
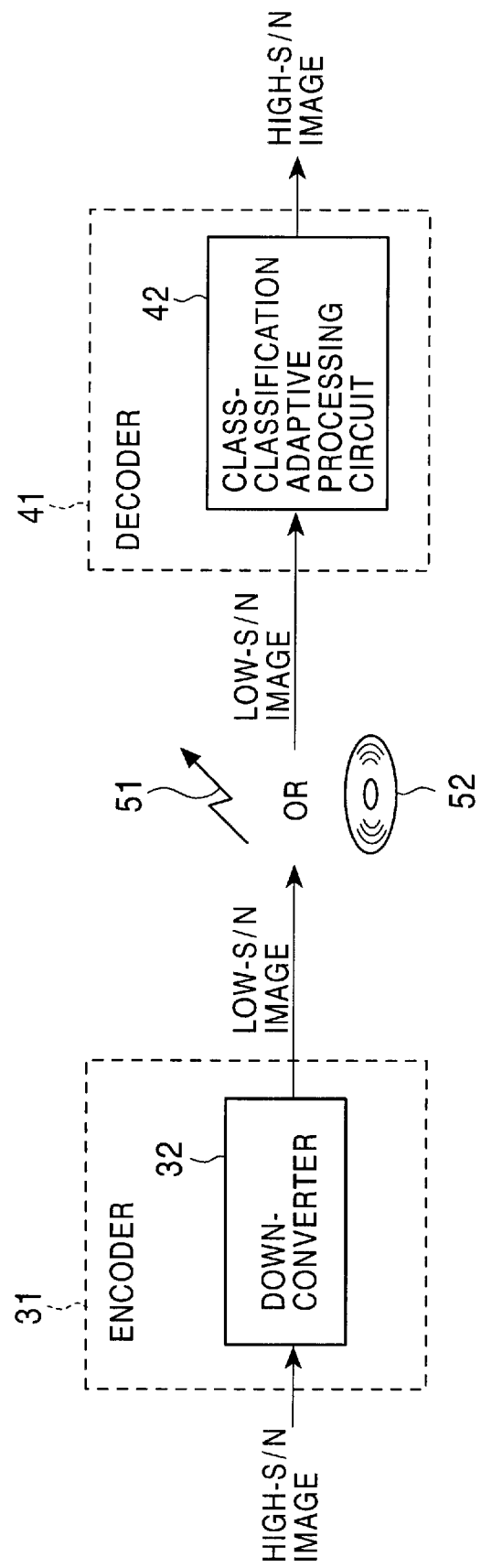
FIG. 3 is a block diagram of a conventional image transfer apparatus.
Figure 4:
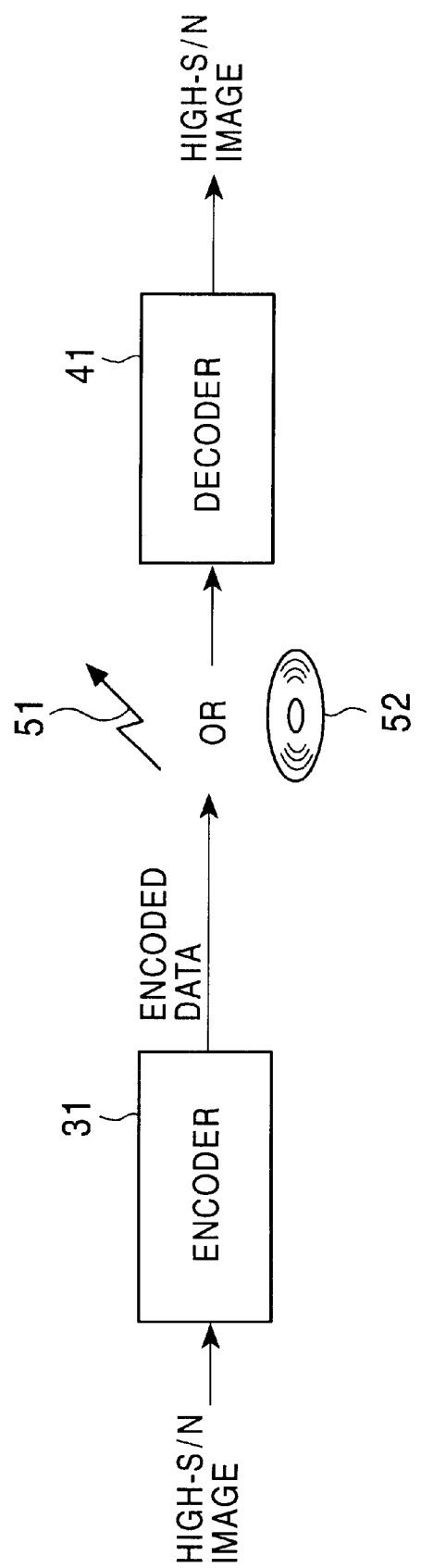
FIG. 4 is a block diagram of an image transfer apparatus according to an embodiment of the present invention.

FIG. 4 shows an example structure of an image transfer apparatus according to an embodiment of the present invention. In FIG. 4, the same symbols as those used in FIG. 3 are assigned to the portions corresponding to those shown in FIG. 3. The image transfer apparatus shown in FIG. 4 is formed of an encoder 31 and a decoder 41, and basically has the same structure as in the case shown in FIG. 3.

Figure 5:
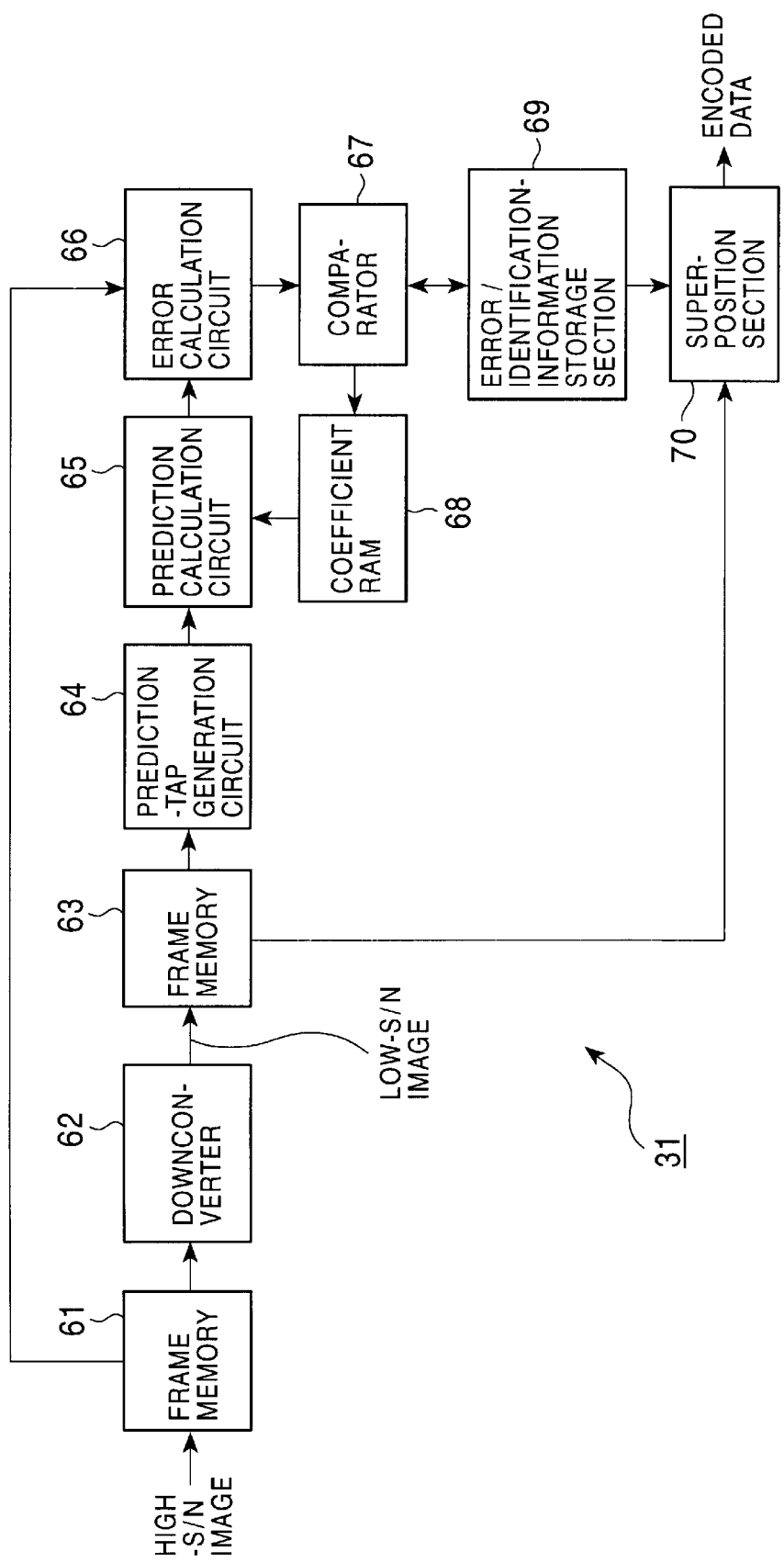
FIG. 5 is a block diagram of an encoder 31 shown in FIG. 4.

FIG. 5 shows an example structure of the encoder 31 shown in FIG. 4.

A frame memory 61 receives a high-s/n image to be processed, and sequentially stores the input high-s/n image, for example, in units of frames. The frame memory 61 can store a plurality of frames of an image, and therefore can handle even a high-s/n moving image.

A downconverter 62 sequentially reads the high-s/n image stored in the frame memory 61, for example, in units of frames to convert it to a low-s/n image. More specifically, the downconverter 62 applies filtering with an LPF or adds noise to the high-s/n image stored in the frame memory 61 to convert it to a low-s/n image. The low-s/n image is sent to a frame memory 63.

It is assumed here that the low-s/n image output from the downconverter 62 has the same number of pixels as the input high-s/n image (the positional relationships among the pixels are also the same). The present invention can also be applied to a case in which the low-s/n image has a smaller number of pixels than the high-s/n image.

The frame memory 63 has the same structure as the frame memory 61, and sequentially stores the low-s/n image output from the downconverter 62, for example, in units of frames.

Figure 1:
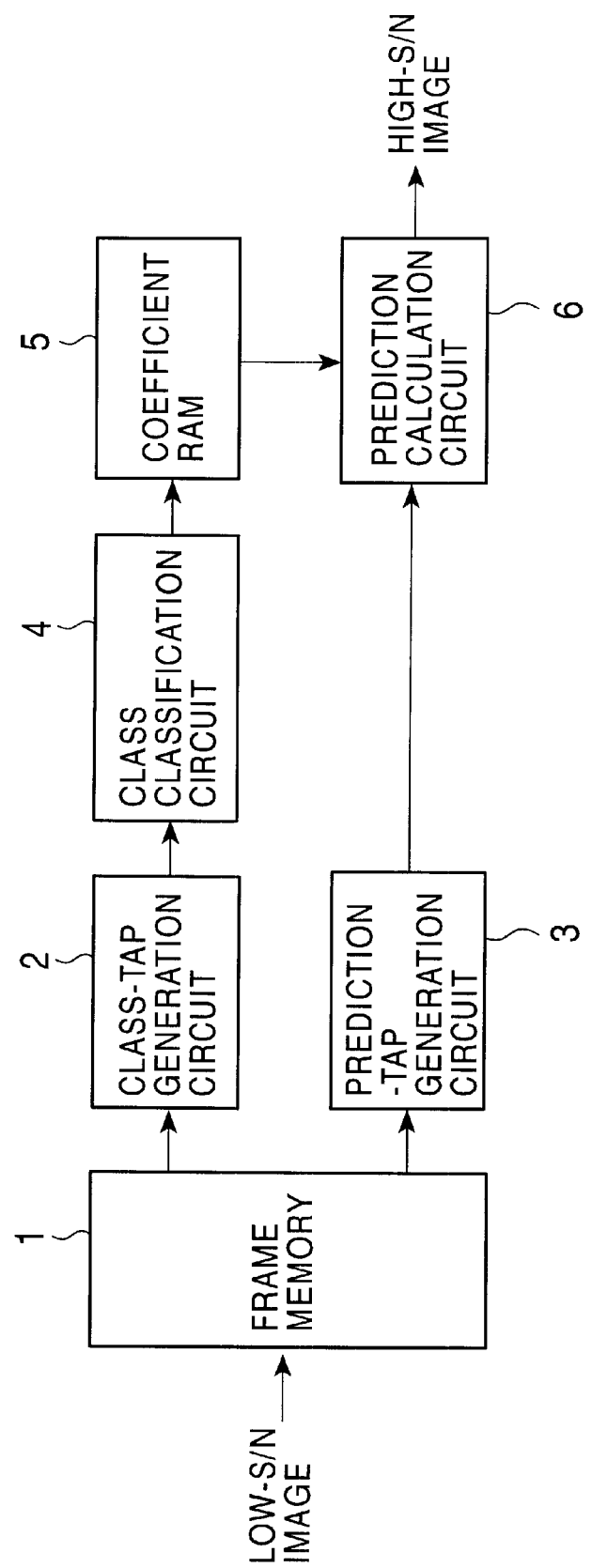
FIG. 1 is a block diagram of a conventional image processing apparatus.

A prediction-tap generation circuit 64 generates a prediction tap in the same way as in the prediction-tap generation circuit 3 shown in FIG. 1. More specifically, the prediction-tap generation circuit 64 selects an aimed-at frame in the high-s/n image stored in the frame memory 61; sequentially sets each pixel (high-s/n pixel) constituting the frame to an aimed-at pixel; reads pixels of the low-s/n image, disposed around the aimed-at pixel (actually, around the low-s/n pixel disposed at the same position as the aimed-at pixel) in a spatial or time manner from the frame memory 63; and sends the read low-s/n pixels to a prediction calculation circuit 65 as a prediction tap.

The prediction calculation circuit 65 receives the prediction tap from the prediction-tap generation circuit 64 and also receives a predetermined prediction-coefficient set from a coefficient RAM 68. The prediction calculation circuit 65 uses the prediction tap and the prediction-coefficient set sent thereto to calculate the linear prediction equation (1); obtains a prediction value of the aimed-at pixel; and sends it to an error calculation circuit 66.

The error calculation circuit 66 reads the high-s/n pixel (actually the pixel value thereof) serving as the aimed-at pixel; obtains the prediction error (for example, the difference between the value of the aimed-at pixel and the prediction value, and the magnitude of the prediction error means that of the absolute value of the prediction error) of the prediction value sent from the prediction calculation circuit 65 against the aimed-at pixel; and sends it to a comparator 67.

The comparator 67 compares the prediction error of the prediction value against the value of the aimed-at pixel, which is sent from the error calculation circuit 66, with a prediction error stored in an error/identification-information storage section 69, and changes the stored value of the error/identification-information storage section 69 according to the comparison result. The comparator 67 also sends identification information described later to the coefficient RAM 68 as an address, and makes the coefficient RAM 68 send the prediction-coefficient set stored at the address to the prediction calculation circuit 65.

The coefficient RAM 68 stores a plurality of prediction-coefficient sets obtained by learning processing executed by a learning apparatus described later with FIG. 9. The coefficient RAM 68 stores each of the plurality of prediction-coefficient sets at the address corresponding to the identification information for identifying each set.

The error/identification-information storage section 69 stores the prediction error of the prediction value of the high-s/n pixel, sent from the comparator 67, and the identification information of the prediction-coefficient set used for obtaining the prediction value, with the correspondence therebetween.

A superposition section 70 reads the frame of the low-s/n image corresponding to the aimed-at frame, stored in the frame memory 63; reads the identification information of the prediction-coefficient set used to obtain the prediction value of the high-s/n pixel corresponding to each low-s/n pixel of the low-s/n image, from the error/identification-information storage section 69; relates it to the low-s/n pixel; and outputs as encoded data.

The correspondence between the low-s/n pixel and the identification information in the superposition section 70 may be generated by adding the bit string of the corresponding identification information to the bit string of the pixel value of the low-s/n image. Alternatively, the correspondence may be generated by replacing lower-order bits of the bit string of the pixel value of the low-s/n image with the bit string of the corresponding identification information.

Figure 6:
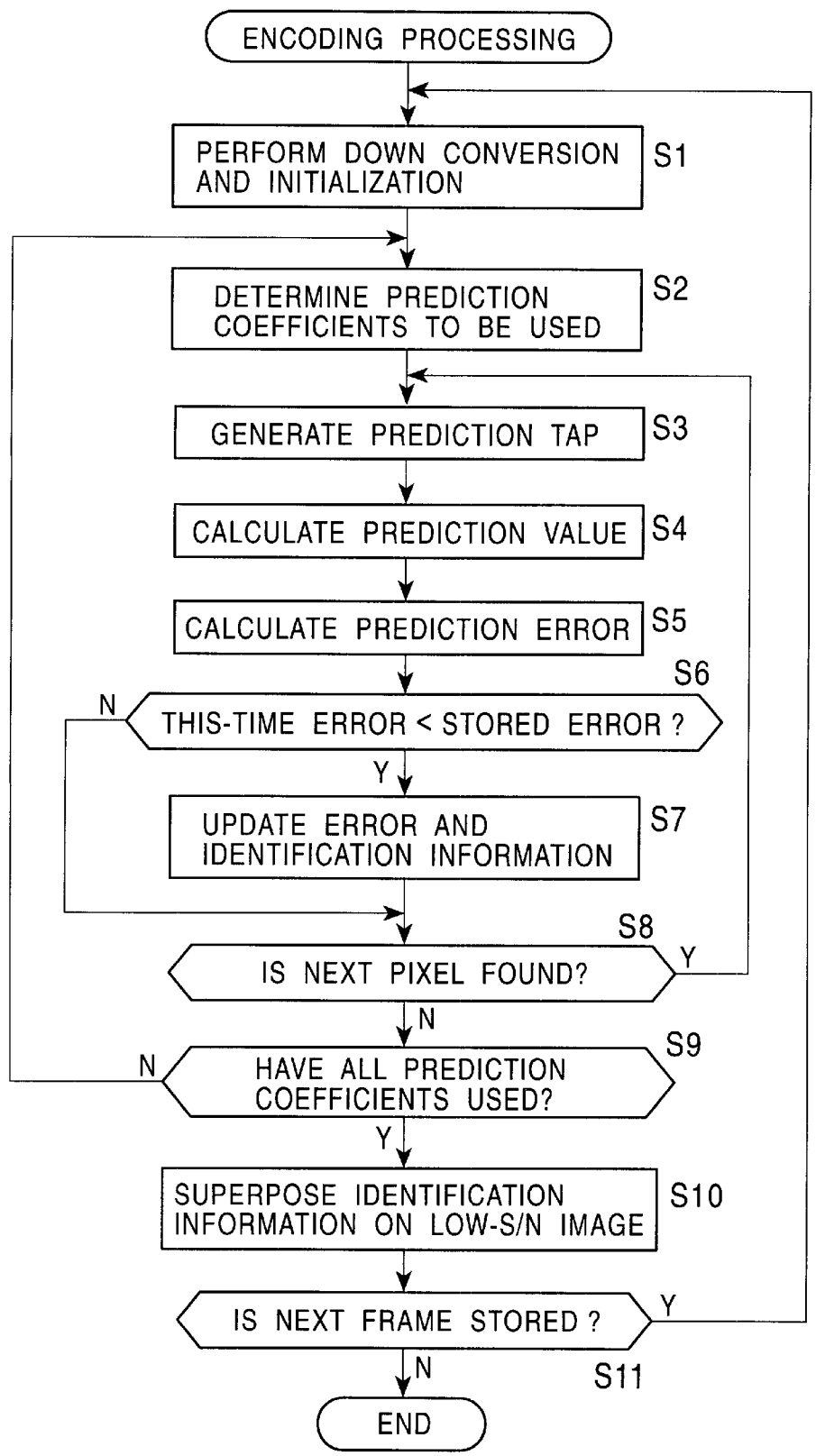
FIG. 6 is a flowchart of the processing of the encoder 31 shown in FIG. 5.

The high-s/n-image encoding processing executed by the encoder 31 shown in FIG. 5 will be described below by referring to a flowchart shown in FIG. 6.

The high-s/n image to be processed is sequentially sent to the frame memory 61. The frame memory 61 sequentially stores the input high-s/n image in units of frames.

In a step S1, the downconverter 62 reads a predetermined frame of the high-s/n image stored in the frame memory 61 as an aimed-at frame, and converts it to a low-s/n image. The low-s/n image is sent to the frame memory 63 and stored.

Also in the step SI, the stored values of the error/identification-information storage section 69 are initialized. More specifically, the prediction errors stored in the error/identification-information storage section 69 are initialized to predetermined large values, and the identification information is initialized to values which cannot be identification information.

The processing proceeds to a step S2. The comparator 67 determines a prediction-coefficient set to be used in the current processing, and outputs the identification information of the determined prediction-coefficient set to the coefficient RAM 68. Then, the determined prediction-coefficient set is read from the coefficient RAM 68 and sent to the prediction calculation circuit 65.

The processing proceeds to a step S3. The prediction-tap generation circuit 64 sets a predetermined high-s/n pixel in the aimed-at frame to an aimed-at pixel and reads low-s/n pixels stored in the frame memory 63 to generate a prediction tap for the aimed-at pixel. The prediction tap is sent to the prediction calculation circuit 65. In a step S4, the prediction calculation circuit 65 uses the prediction tap sent from the prediction-tap generation circuit 64 and the determined prediction-coefficient set sent from the coefficient RAM 68 to calculate the prediction value of the aimed-at pixel. The prediction value is sent from the prediction calculation circuit 65 to the error calculation circuit 66.

In a step S5, the error calculation circuit 66 calculates the prediction error between the value of the aimed-at pixel in the high-s/n image sent from the frame memory 61 and the prediction value sent from the prediction calculation circuit 65, and sends it to the comparator 67. In a step S6, the comparator 67 determines whether the prediction error obtained this time (hereinafter called a this-time error, if necessary) is smaller than the prediction error (hereinafter called a stored error, if necessary) of the aimed-at pixel stored in the error/identification-information storage section 69.

When it is determined in the step S6 that the time-time error is smaller than the stored error, in other words, when the prediction error of the prediction value obtained by using the this-time prediction-coefficient set (the prediction-coefficient set read from the coefficient RAM 68 in the step S2 in the current loop) is smaller than the prediction error (the prediction error of the prediction value obtained by using the prediction-coefficient set which has been read from the coefficient RAM 68 so far) of the prediction value which has been obtained so far, namely when a prediction value closer to the aimed-at pixel is obtained by using the this-time prediction-coefficient set, the processing proceeds to a step S7. The comparator 67 updates the stored contents of the error/identification-information storage section 69, and the processing proceeds to a step S8.

More specifically, the comparator 67 relates the this-time error to the identification information of the this-time prediction-coefficient set, and stores (overwrites) them in the error/identification-information storage section 69 as substitutes for the stored prediction error and the identification information corresponding thereto for the aimed-at pixel.

When it is determined in the step S6 that the this-time error is not smaller than the stored error, the processing skips the step S7 and proceeds to a step S8. A controller or another unit determines whether a high-s/n pixel to be set to an aimed-at pixel is still found in the aimed-at frame. When the controller or another unit determines in the step S8 that a high-s/n pixel to be set to an aimed-at pixel next is found in the aimed-at frame, the high-s/n pixel is newly set to an aimed-at pixel, the processing returns to the step S3, and the subsequent processes are repeated.

When the controller or another unit determines in the step S8 that a high-s/n pixel to be set to an aimed-at pixel next is not found in the aimed-at frame, in other words, when prediction values have been calculated by using determined prediction-coefficient sets with all high-s/n pixels being set to aimed-at pixels in the aimed-at frame, the processing proceeds to a step S9, and the controller or another unit determines whether prediction values have been calculated for the aimed-at frame by using all prediction-coefficient sets stored in the coefficient RAM 68.

When the controller or another unit determines in the step S9 that prediction values have not yet been calculated for the aimed-at frame by using all the prediction-coefficient sets stored in the coefficient RAM 68, the processing returns to the step S2 and the comparator 67 sets a prediction-coefficient set which has not yet been set to a determined prediction-coefficient set in the aimed-at frame among the plurality of prediction-coefficient sets stored in the coefficient RAM 68 to a new determined prediction-coefficient set. Then the subsequent processes are repeated from the step S3.

On the other hand, when the controller or another unit determines in the step S9 that prediction values have been calculated for the aimed-at frame by using all the prediction-coefficient sets stored in the coefficient RAM 68, in other words, when the identification information of the prediction-coefficient set which minimizes the prediction error of the prediction value of each high-s/n pixel constituting the aimed-at pixel has been stored in the error/identification-information storage section 69, the processing proceeds to a step S10 and the superposition section 70 reads the low-s/n-image frame corresponding to the aimed-at frame, stored in the frame memory 63, and the identification information corresponding to each high-s/n pixel in the aimed-at frame, stored in the error/identification-information storage section 69; relates them (relates the low-s/n pixel disposed at the same position as each high-s/n pixel in the aimed-at frame to the identification information corresponding to the high-s/n pixel); and outputs them as encoded data.

The processing proceeds to a step S11, and the controller and another unit determines whether a high-s/n-image frame to be processed next is stored in the frame memory 61. When it is determined that the frame is stored, the frame is set to a new aimed-at frame, the processing returns to a step S1, and the subsequent processes are repeated.

When the controller or another unit determines in the step S11 that a high-s/n-image frame to be processed next is not stored in the frame memory 61, the encoding processing is terminated.

As described above, since the encoder 31 detects a prediction-coefficient set which minimizes the prediction error of each high-s/n pixel among the plurality of prediction-coefficient sets, and outputs the identification information of the prediction-coefficient set together with the low-s/n pixel, the decoder 41 can convert the low-s/n pixel to a high-s/n pixel having a small prediction error by performing adaptive processing by using the prediction-coefficient set corresponding to the identification information.

Figure 7:
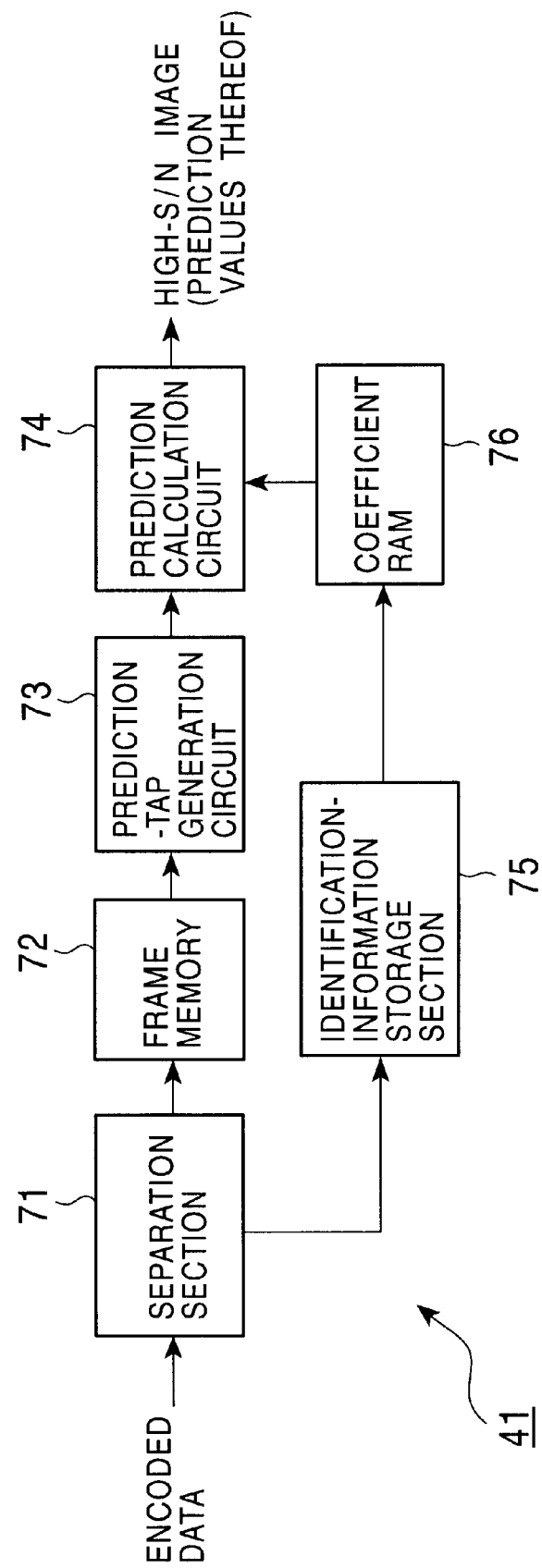
FIG. 7 is a block diagram of a decoder 41 shown in FIG. 4.

FIG. 7 shows an example structure of the decoder 41 shown in FIG. 4, which converts low-s/n pixels to high-s/n pixels.

A separation section 71 receives encoded data, separates a low-s/n image and identification information in the input encoded data, and outputs them. A frame memory 72 has the same structure as the frame memory 61 shown in FIG. 5, and stores the low-s/n image output from the separation section 71, for example, in units of frames.

A prediction-tap generation circuit 73 sets a high-s/n pixel for which a prediction value is to be obtained to an aimed-at pixel, generates a prediction tap for the aimed-at pixel by using low-s/n pixels stored in the frame memory 72, and outputs the tap to a prediction calculation circuit 74 in the same way as in the prediction-tap generation circuit 64 shown in FIG. 5. An identification-information storage section 75 stores the identification information added to the low-s/n pixels of the low-s/n image, output from the separation section 71, and sends the identification information corresponding to the low-s/n pixel disposed at the same position as the aimed-at pixel to a coefficient RAM 76 as an address.

The coefficient RAM 76 stores the same prediction-coefficient sets as the coefficient RAM 68 shown in FIG. 5, and sends the prediction-coefficient set corresponding to the identification information sent from the identification-information storage section 75, to the prediction calculation circuit 74.

The prediction calculation circuit 74 uses the prediction tap sent from the prediction-tap generation circuit 73 and the prediction-coefficient set sent from the coefficient RAM 76 to calculate the linear prediction equation (1), obtains the prediction value of the high-s/n pixel serving as the aimed-at pixel, and outputs it.

Figure 8:
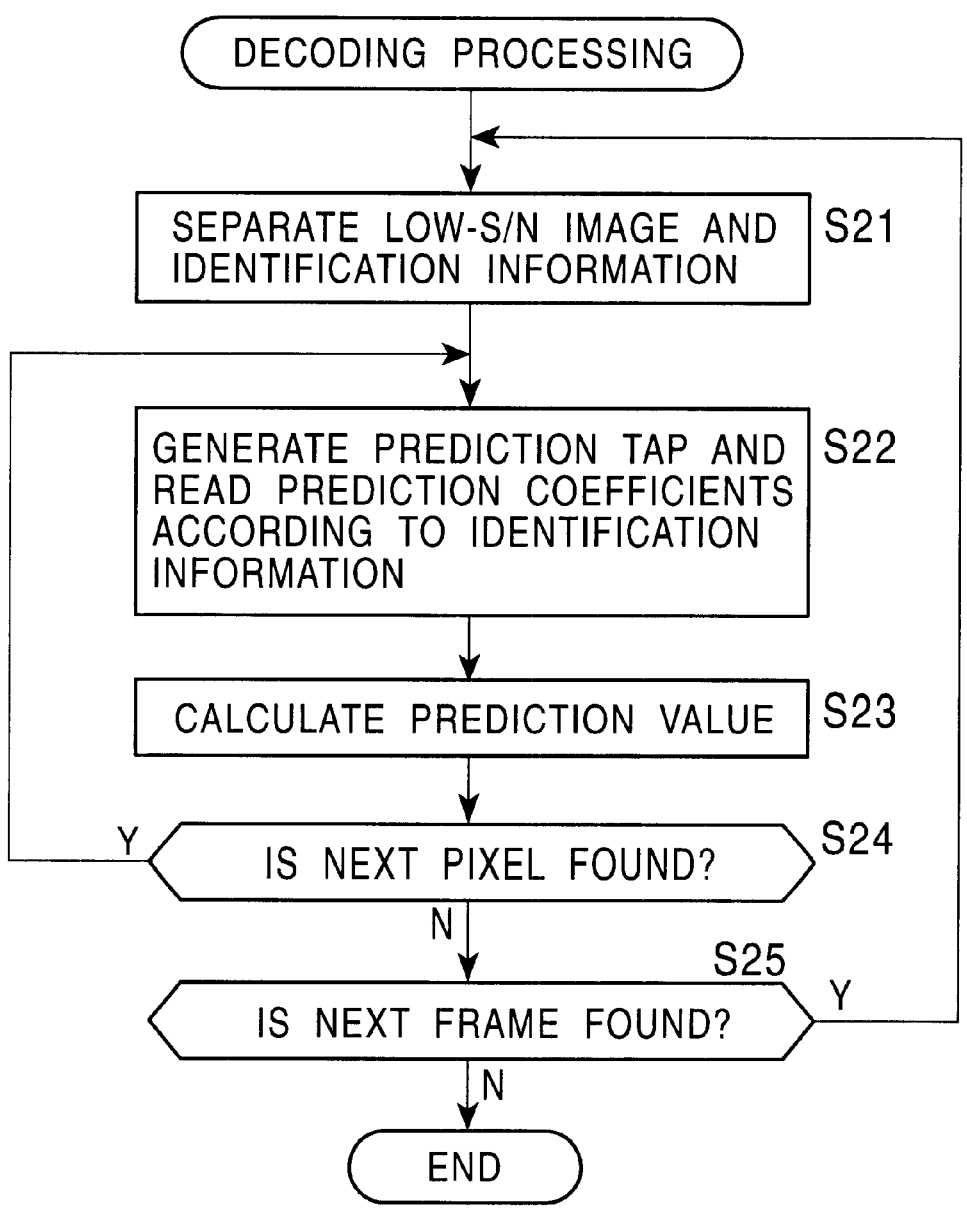
FIG. 8 is a flowchart of the processing of the decoder 41 shown in FIG. 7.

The low-s/n-image decoding processing (processing for converting a low-s/n image to a high-s/n image (the prediction values thereof)) executed by the decoder 41 shown in FIG. 7 will be described below by referring to a flowchart shown in FIG. 8.

The separation section 71 sequentially receives encoded data. In a step S21, the separation section 71 separates a low-s/n image and identification information in the received encoded data, sends the low-s/n image to the frame memory 72 to make it store the image, and sends the identification information to the identification-information storage section 75 to make it store the information.

Then, the prediction-tap generation circuit 73 sets a frame in the high-s/n image corresponding to the low-s/n image stored in the frame memory 72 to an aimed-at frame, and sets a predetermined high-s/n pixel in the aimed-at frame to an aimed-at pixel. In a step S22, the prediction-tap generation circuit 73 reads required low-s/n pixels from the frame memory 72 to generate a prediction tap for the aimed-at pixel, and outputs it to the prediction calculation circuit 74.

Also in the step S22, the identification-information storage section 75 reads the identification information corresponding to the aimed-at pixel, and sends it to the coefficient RAM 76 as an address. Then, the coefficient RAM 76 reads the prediction-coefficient set specified by the identification information corresponding to the aimed-at pixel.

In a step S23, the prediction calculation circuit 74 uses the prediction tap sent from the prediction-tap generation circuit 73 and the prediction-coefficient set sent from the coefficient RAM 76 to calculate the linear prediction equation (1), obtains the prediction value of the aimed-at pixel, and outputs it. As described above, since this prediction value is obtained when the prediction error of the aimed-at pixel becomes minimum during linear prediction of the aimed-at pixel by using each of the plurality of prediction-coefficient sets, the prediction value has the minimum prediction error.

Then, the processing proceeds to a step S24, and the controller or another unit determines whether a high-s/n pixel which is to be set to an aimed-at pixel next is still found in the aimed-at frame. When the controller or another unit determines in the step S24 that a high-s/n pixel to be set to an aimed-at pixel next is found in the aimed-at frame, the high-s/n pixel is set to a new aimed-at pixel, the processing returns to the step S22, and the subsequent processes are repeated.

When the controller or another unit determines in the step S24 that a high-s/n pixel to be set to an aimed-at pixel next is not found in the aimed-at frame, in other words, when the prediction values of all high-s/n pixels have been obtained with the pixels being set to aimed-at pixels in the aimed-at frame, the processing proceeds to a step S25, and it is determined whether the encoded data corresponding to the next frame has been sent to the separation section 71. When the controller or another unit determines in the step S25 that the encoded data corresponding to the next frame has been sent to the separation section 71, the high-s/n-image frame corresponding to the next frame is set to a new aimed-at frame, the processing returns to the step S21, and the subsequent processes are repeated.

On the other hand, when the controller or another unit determines in the step S25 that the encoded data corresponding to the next frame has not been sent to the separation section 71, the encoding processing is terminated.

As described above, since the prediction value of each high-s/n pixel is obtained by using the prediction-coefficient set corresponding to the identification information, the prediction values having small prediction errors, namely, an image having an improved s/n, is obtained.

Figure 2:
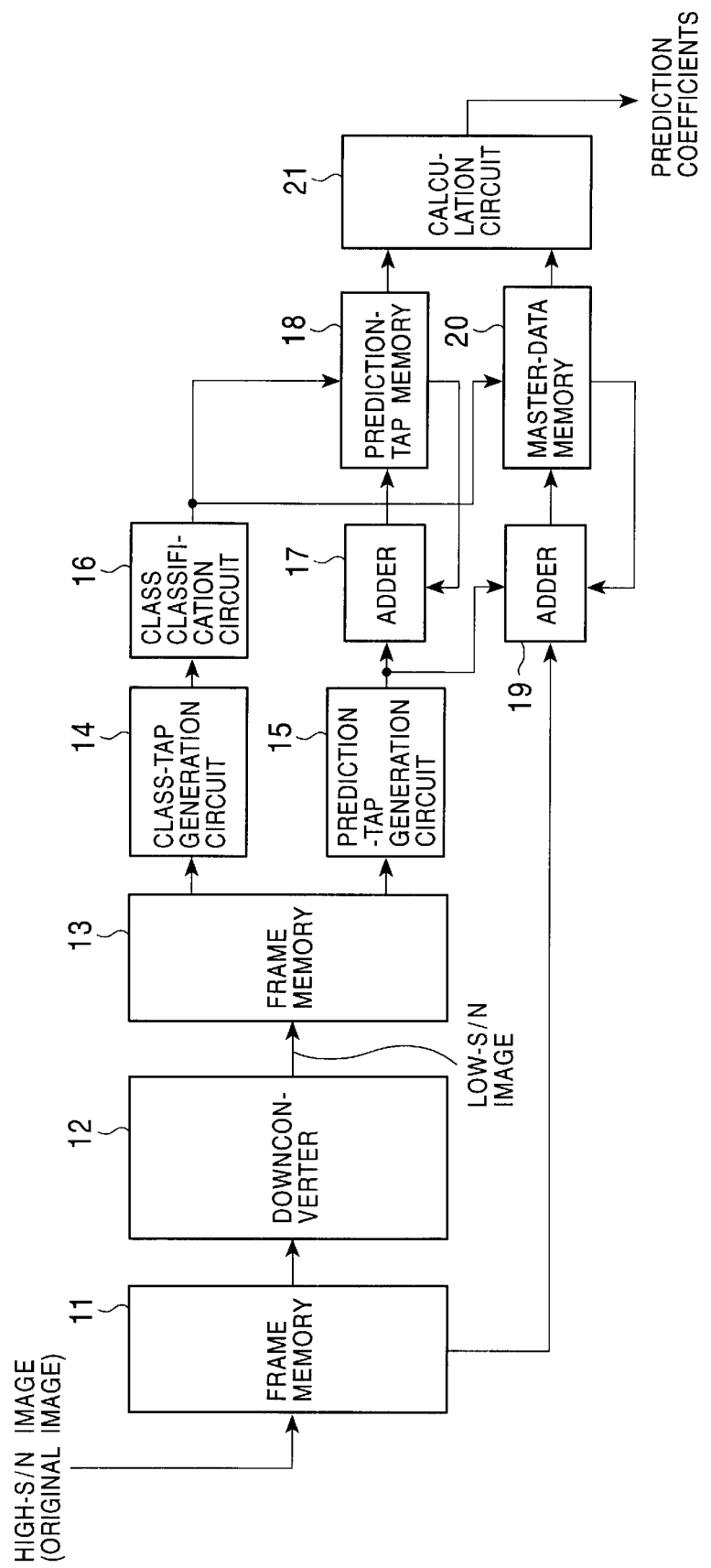
FIG. 2 is a block diagram of a conventional learning apparatus.

A plurality of prediction-coefficient sets obtained by the learning apparatus shown in FIG. 2 may be stored in the coefficient RAM 68 shown in FIG. 5 and the coefficient RAM 76 shown in FIG. 7. Since the learning apparatus shown in FIG. 2 obtains a prediction-coefficient set for each class as described above, however, such a prediction-coefficient set is not necessarily most appropriate in terms of further reducing a prediction error.

Figure 9:
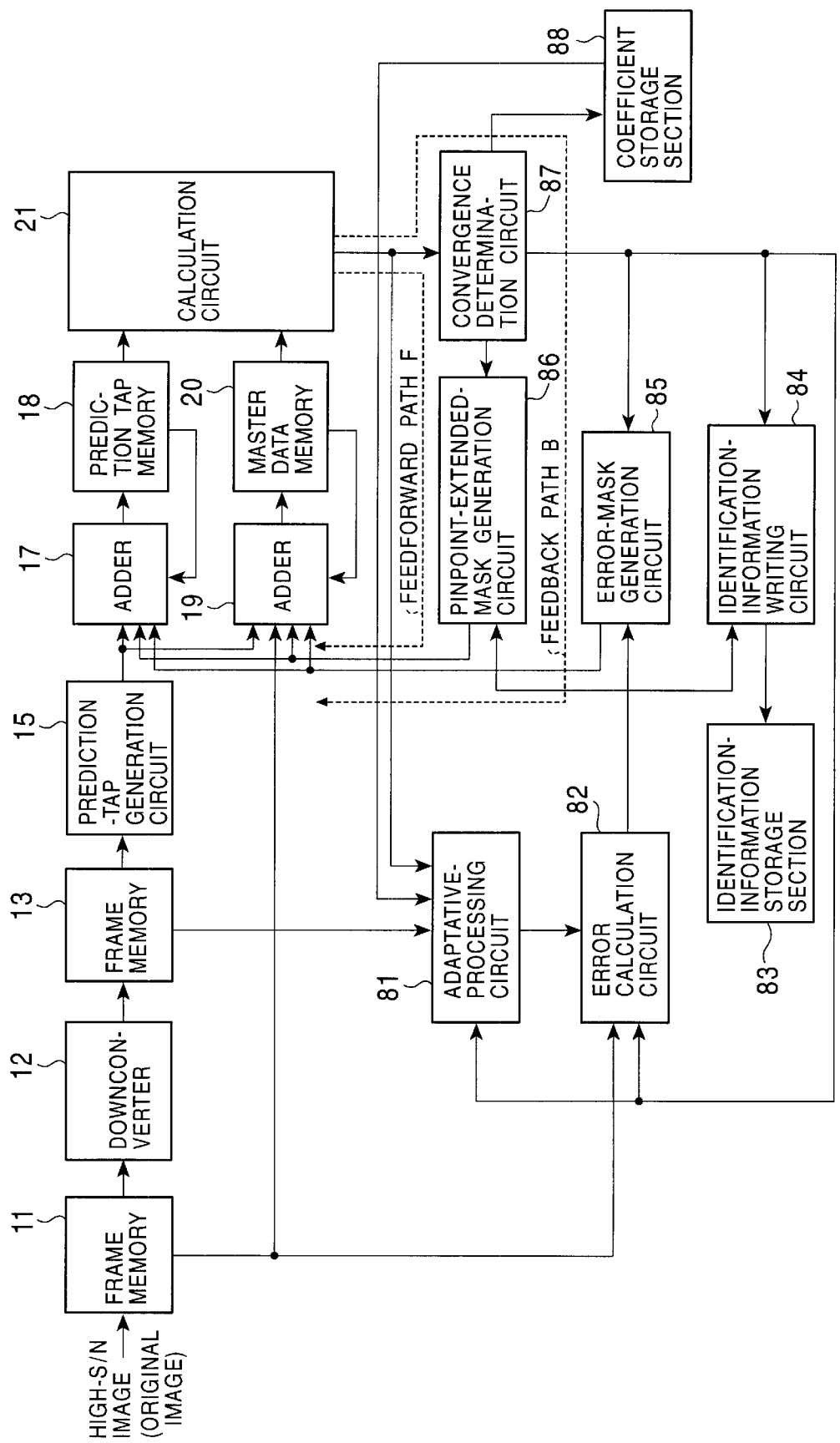
FIG. 9 is a block diagram of a learning apparatus according to an embodiment of the present invention.
Figure 10A:
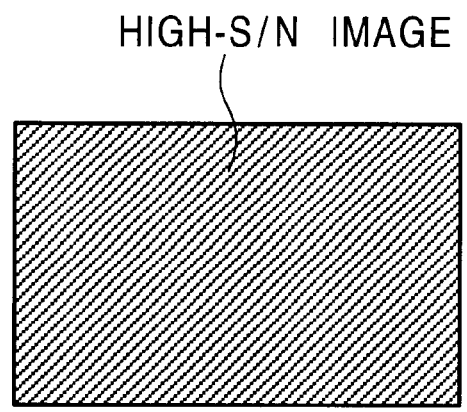
FIG. 10A is a view showing that all high-s/n pixels in one frame are processed in first adaptive processing of the learning apparatus shown in FIG. 9.
Figure 10B:
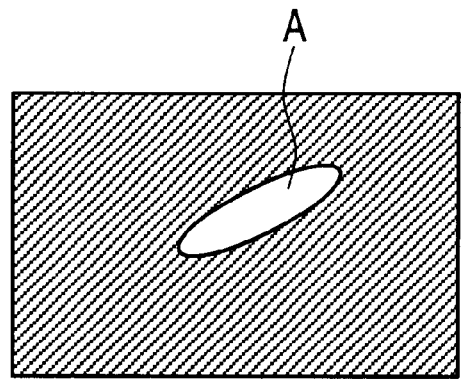
FIG. 10B is a view showing that high-s/n pixels outside the area A where small prediction errors are obtained are processed among the high-s/n pixels shown in FIG. 10A, in second adaptive processing.
Figure 10C:
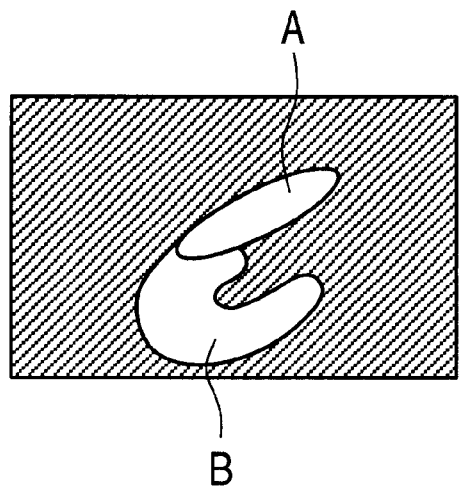
FIG. 10C is a view showing that high-s/n pixels outside the area B where smaller prediction errors are obtained are processed among the high-s/n pixels shown in FIG. 10B, in third adaptive processing.

FIG. 9 shows an example structure of a learning apparatus for executing learning to obtain a plurality of the most appropriate prediction-coefficient sets to be stored in the coefficient RAM 68 shown in FIG. 5 and in the coefficient RAM 76 shown in FIG. 7. In FIG. 9, the same symbols as those used in FIG. 2 are assigned to the portions corresponding to those shown in FIG. 2, and descriptions thereof will be omitted.

An adaptive-processing circuit 81 receives a low-s/n image serving as apprentice data stored in a frame memory 13, a prediction-coefficient set obtained in a calculation circuit 21, and a prediction-coefficient set stored in a coefficient storage section 88. The adaptive-processing circuit 81 uses the low-s/n image and the prediction-coefficient sets to execute adaptive processing, namely, to calculate the linear prediction equation (1) to obtain the prediction values of the high-s/n image (master data) corresponding to the low-s/n image. The prediction values are sent to an error calculation circuit 82.

The error calculation circuit 82 receives the high-s/n image from a frame memory 11 in addition to the prediction values of the high-s/n image from the adaptive-processing circuit 81. The error calculation circuit 82 calculates the prediction error of the prediction value of each high-s/n pixel against its true value, and sends it to an identification-information writing circuit 84, to an error-mask generation circuit 85, and to a pinpoint-extended-mask generation circuit 86.

An identification-information storage section 83 stores the identification information of the prediction-coefficient set most appropriate (which minimizes the prediction error of a prediction value) for obtaining the prediction value of each high-s/n pixel (since the high-s/n image has the same number of pixels as the low-s/n image, each high-s/n pixel means each low-s/n pixel) constituting the high-s/n image.

The identification-information writing circuit 84 writes the identification information into the identification-information storage section 83 according to the output of a convergence determination circuit 87 and the output of the error calculation circuit 82.

The error-mask generation circuit 85 generates (changes) an error mask serving as first weights for summation components in the normal equations (7), and sends them to adders 17 and 19.

The pinpoint-extended-mask generation circuit 86 generates (changes) a pinpoint extended mask serving as second weights for the summation components in the normal equations (7), and sends them to adders 17 and 19.

The convergence determination circuit 87 determines whether a prediction-coefficient set output from a calculation circuit 21 converges, and sends the determination result to the identification-information writing circuit 84, to the error-mask generation circuit 85, and to the pinpoint-extended-mask generation circuit 86. When the convergence determination circuit 87 determines that the prediction-coefficient set output from the calculation circuit 21 has converged, it specifies the identification information corresponding to the prediction-coefficient set and sends the information as well as the prediction-coefficient set to the coefficient storage section 88.

The coefficient storage section 88 stores the prediction-coefficient set output from the convergence determination circuit 87 at the address corresponding to the identification information also output from the convergence determination circuit 87.

Outlined learning processing for obtaining a plurality of prediction-coefficient sets, executed in the learning apparatus shown in FIG. 9 will be described below by referring to FIGS. 10A to 10C and FIGS. 11A to 11C. To make the description simple, it is assumed that one frame of a high-s/n image serving as master data for learning is prepared.

The learning apparatus shown in FIG. 9 applies first adaptive processing (the adaptive processing here refers to processing for solving the normal equations (7)) to all the high-s/n pixels constituting one frame of the high-s/n image to obtain prediction values by using the identical prediction-coefficient set. In this case, the same prediction-coefficient set as that obtained when the learning apparatus shown in FIG. 2 executes learning processing with only one class (a mono class, this means that there is no class) is obtained.

The prediction error of the prediction value of each high-s/n pixel in one frame may be small with the prediction-coefficient set obtained by the first adaptive processing. In general, some high-s/n pixels have small prediction errors, other high-s/n pixels have intermediate prediction errors, and still other high-s/n pixels have large prediction errors.

The learning apparatus shown in FIG. 9 applies second adaptive processing to high-s/n pixels for which the prediction values having not small prediction errors have been obtained to calculate a new prediction-coefficient set. More specifically, when prediction values having small prediction errors are obtained for the high-s/n pixels positioned in the area A shown in FIG. 10B with the prediction-coefficient set obtained by the first adaptive processing, which has been applied to all the high-s/n pixels in one frame shown in FIG. 10A, for example, the second adaptive processing is applied only to high-s/n pixels outside the area A.

The prediction error of the prediction value of each high-s/n pixel to which the second adaptive processing has been applied may be small with the prediction-coefficient set newly obtained. In general, some high-s/n pixels have small prediction errors, others have intermediate prediction errors, and still others have large prediction errors.

The learning apparatus shown in FIG. 9 applies third adaptive processing to high-s/n pixels for which the prediction values having not small prediction errors have been obtained to calculate a further new prediction-coefficient set. More specifically, when prediction values having small prediction errors are obtained for the high-s/n pixels positioned in the area B shown in FIG. 10C with the prediction-coefficient set obtained by the second adaptive processing, which has been applied to all the high-s/n pixels outside the area A shown in FIG. 10B, for example, the third adaptive processing is applied only to high-s/n pixels outside the areas A and B.

The above processing is repeated to sequentially obtain a prediction-coefficient set which makes prediction errors small for each group of high-s/n pixels in all the high-s/n pixels serving as the master data.

Figure 11A:
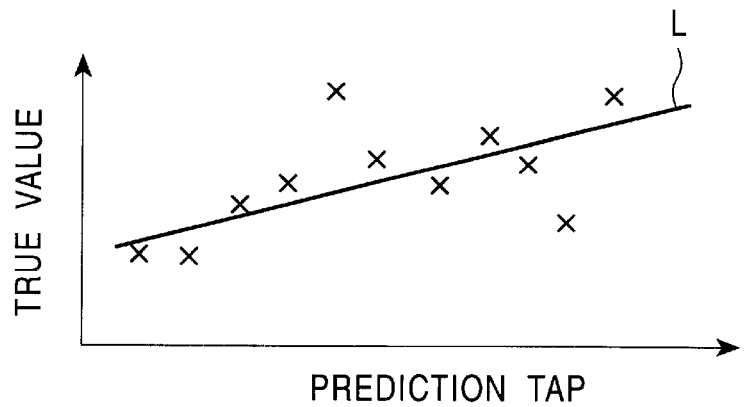
FIG. 11A is a chart showing the concept of adaptive processing in the learning apparatus shown in FIG. 9.

The processing for obtaining a prediction-coefficient set by solving the normal equations (7) for a plurality of high-s/n pixels, which is adaptive processing, means to obtain a straight line L which approximates sample values (indicated by x marks in FIGS. 11A to 11C) showing the relationship between the true value of each of the plurality of high-s/n pixels and the prediction tap corresponding to each high-s/n pixel, as shown in FIG. 11A. The straight line L is obtained by minimizing the sum of the squares of the distances to the sample points, and corresponds to the prediction-coefficient set obtained by the first adaptive processing, in FIG. 11A.

Figure 11B:
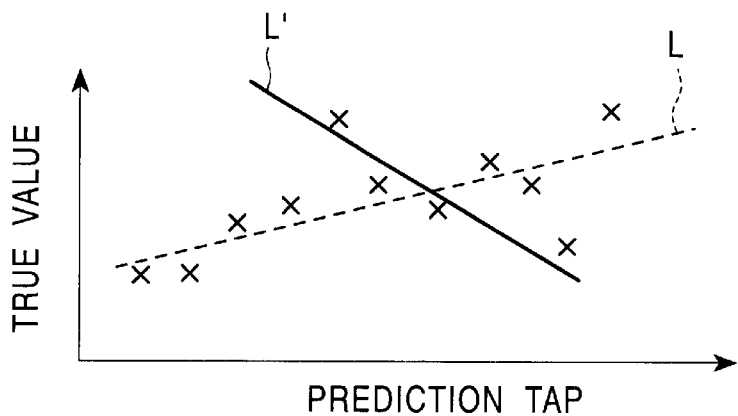
FIG. 11B is a chart showing the concept of the second adaptive processing shown in FIG. 10B.

Since a prediction-coefficient set is obtained in the second adaptive processing only for high-s/n pixels having not small prediction errors, the second adaptive processing means obtaining a straight line L' which approximates sample points far from the straight line L, as shown in FIG. 11B.

As described above, the learning apparatus shown in FIG. 9 repeats adaptive processing only for high-s/n pixels having not small prediction errors with the prediction-coefficient set obtained by the previous adaptive processing to obtain prediction-coefficient sets which make prediction errors small for all high-s/n pixels serving as master data. When a prediction-coefficient set obtained by certain adaptive processing is used, however, even among high-s/n pixels having small prediction errors with the prediction-coefficient set, they have differences in the magnitude of prediction errors. In other words, in FIG. 11A, among sample points close to the straight line L, they have differences in the distance to the straight line L.

Figure 11C:
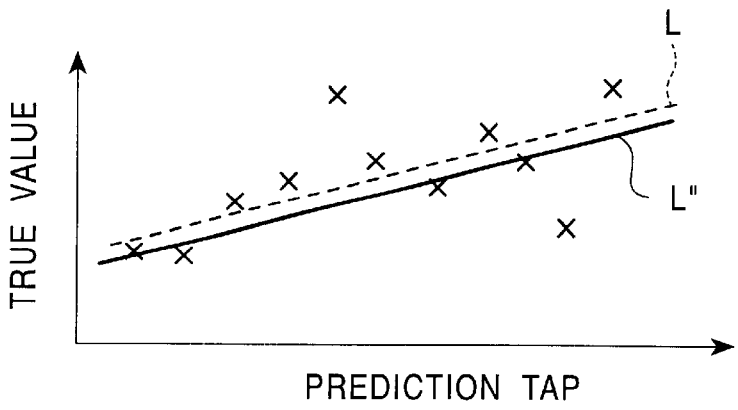
FIG. 11C is a chart showing the result of adaptive processing executed with sample points having small prediction errors being focused on, to further improve the precision of the prediction executed in the adaptive processing shown in FIG. 11A.

To further improve the precision of prediction (to make prediction errors further smaller), the learning apparatus shown in FIG. 9 executes adaptive processing with sample points having small prediction errors (hereinafter called small-error sample points, if necessary) being focused on. Adaptive processing is executed with sample points (small-error sample points) close to the straight line L being focused on in FIG. 11A. A straight line L" which makes the distances to the small-error sample points shorter is obtained in the adaptive processing as shown in FIG. 11C. Therefore, a prediction-coefficient set which makes the prediction errors of the prediction values of the high-s/n pixels corresponding to the small-error sample points smaller is obtained.

In this case, among the sample points close to the straight line L, prediction errors become large for sample points relatively distant from the straight line L. The prediction errors of those sample points are reduced (a prediction-coefficient set which makes the prediction errors smaller is obtained) since adaptive processing is repeatedly executed only for high-s/n pixels having not small prediction errors, as described above.

As described above, the learning apparatus shown in FIG. 9 repeatedly executes adaptive processing only for high-s/n pixels having not small prediction errors with a prediction-coefficient set obtained by previous adaptive processing. In the above case, to make a description simple, adaptive processing is again applied only to high-s/n pixels having not small prediction errors with a prediction-coefficient set obtained by previous adaptive processing. In the present embodiment, adaptive processing is executed with high-s/n pixels having large prediction errors when a prediction-coefficient set obtained by previous adaptive processing is used being focused on. For high-s/n pixels having large prediction errors when the prediction-coefficient set obtained by the current adaptive processing is used, a prediction-coefficient set which does not make the prediction errors large is obtained in the next adaptive processing.

The learning apparatus shown in FIG. 9 next executes adaptive processing with sample points having small prediction errors being focused on. Therefore, a prediction-coefficient set which makes the prediction errors smaller is obtained.

Hereinafter, feedforward processing refers to adaptive processing executed with high-s/n pixels having small prediction errors being focused on to obtain a prediction-coefficient set which makes the prediction errors smaller. Feedback processing refers, in contrast to the feedforward processing, to adaptive processing executed with high-s/n pixels having large prediction errors being focused on to obtain a prediction-coefficient set which does not make the prediction errors large.

The feedback processing is implemented, as shown by the dotted arrow B in FIG. 9, by a signal (error mask) sent from the calculation circuit 21 to the adders 17 and 19 through the convergence determination circuit 87 and the error-mask generation circuit 85. The feedforward processing is implemented, as shown by the dotted arrow F in FIG. 9, by a signal (pinpoint extended mask) sent from the calculation circuit 21 to the adders 17 and 19 through the convergence determination circuit 87 and the pinpoint-extended-mask generation circuit 86.

Figure 12:
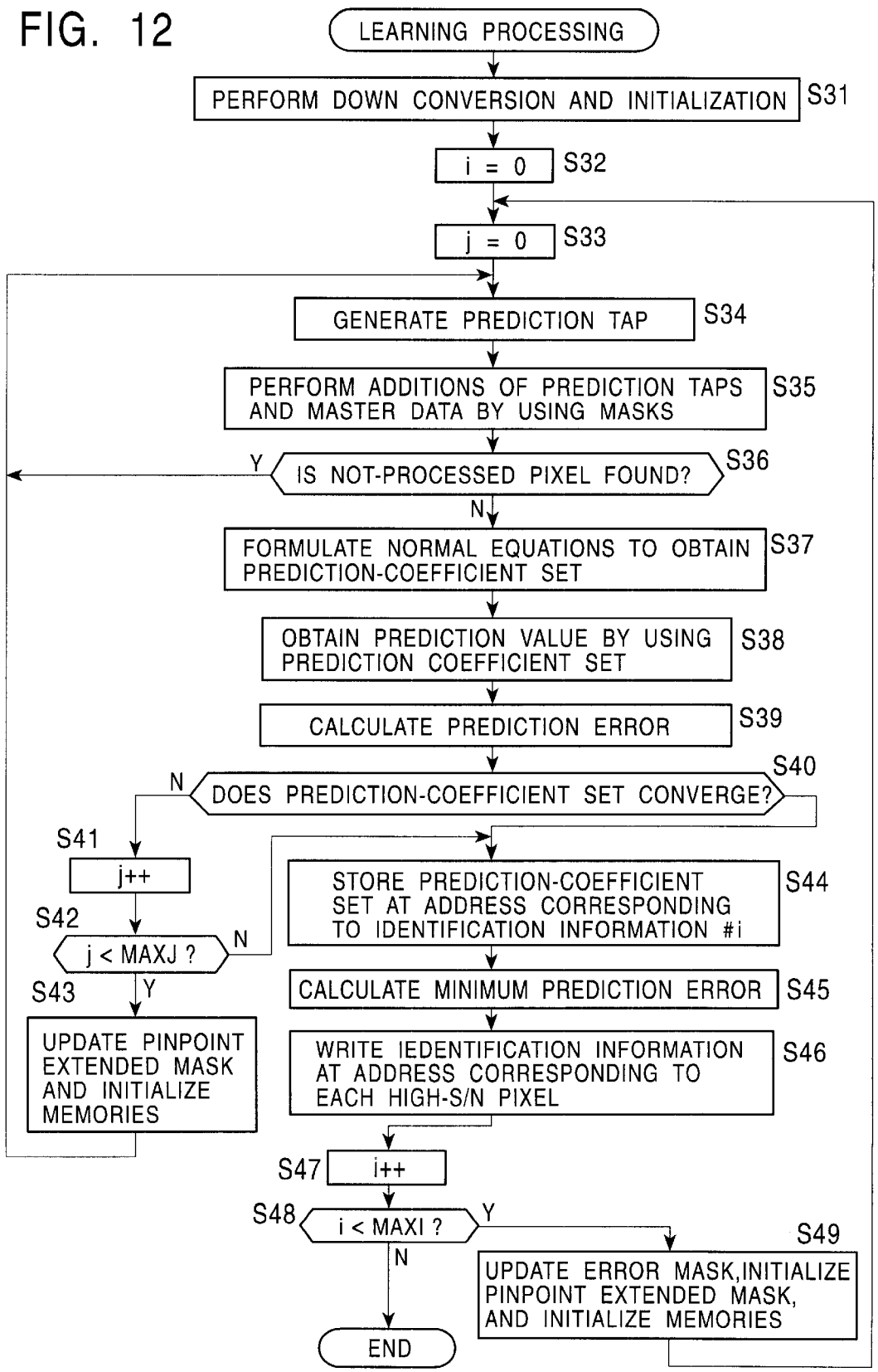
FIG. 12 is a flowchart of the processing of the learning apparatus shown in FIG. 9.

The learning processing executed by the learning apparatus shown in FIG. 9 will be further described by referring to a flowchart shown in FIG. 12.

A high-s/n image serving as master data is sent to the frame memory 11 and stored. In a step S31, the downconverter 32 generates a low-s/n image serving as apprentice data from the high-s/n image serving as the mater data stored in the frame memory 11, and sends it to the frame memory 13 and makes the memory store it. Also in the step S31, various types of initialization is performed. The prediction-tap memory 18, the master-data memory 20, and the coefficient storage section 88 are cleared. Values stored in the identification-information storage section 83 are set to values which cannot be identification information. Furthermore, in the step S31, the error mask stored in the error-mask generation circuit 85 and the pinpoint extended mask stored in the pinpoint-extended-mask generation circuit 86 are initialized, for example, to 1.

In a step S32, an controller or another unit initializes a variable "i" serving as identification information, for example, to zero. The processing proceeds to a step S33, and the controller or another unit initializes a variable "j" for counting the number of times processing for making a prediction-coefficient set converge is executed, for example, to zero.

Then, the processing proceeds to a step S34. The prediction-tap generation circuit 15 sets a high-s/n pixel in the master data to an aimed-at pixel, and generates a prediction tap for the aimed-at pixel by reading low-s/n pixels stored in the frame memory 13. The prediction tap is sent to the adders 17 and 19.

The adders 17 and 19 execute additions for the prediction tap (apprentice data) and the master data in a step S35.

More specifically, the stored values of the prediction-tap memory 18 are read and sent to the adder 17. The adder 17 uses the stored values of the prediction-tap memory 18 and the low-s/n pixels constituting the prediction tap sent from the prediction-tap generation circuit 15 to execute the calculation (additions) of the summations serving as the multipliers of the prediction coefficients at the left side of the normal equations (7) in the same way as in the learning apparatus shown in FIG. 2.

In these additions, the adder 17 applies weights by using the error mask output from the error-mask generation circuit 85 and the pinpoint extended mask output from the pinpoint-extended-mask generation circuit 86.

The adder 17 executes the calculation (additions) of the summations serving as the multipliers of the prediction coefficients at the left side of the normal equations shown below, which is obtained by multiplying the summation components of the equations (7) by a weight $w_i$, where $y_i$ indicates the i-th master data, $x_{ij}$ indicates the j-th apprentice data constituting a prediction tap used for obtaining the prediction value of the master data $y_i$, and $h_i$ indicates the weight applied to the combination of the master data $y_i$ and the corresponding tap by the error mask and the pinpoint extended mask.

$$\begin{cases} \left(\sum_{i=1}^{m} x_{i1}x_{i1}h_i\right)w_1 + \left(\sum_{i=1}^{m} x_{i1}x_{i2}h_i\right)w_2 + \ldots + \left(\sum_{i=1}^{m} x_{i1}x_{in}h_i\right)w_n = \left(\sum_{i=1}^{m} x_{i1}y_ih_i\right) \\ \left(\sum_{i=1}^{m} x_{i2}x_{i1}h_i\right)w_1 + \left(\sum_{i=1}^{m} x_{i2}x_{i2}h_i\right)w_2 + \ldots + \left(\sum_{i=1}^{m} x_{i2}x_{in}h_i\right)w_n = \left(\sum_{i=1}^{m} x_{i2}y_ih_i\right) \\ \quad\quad\quad\quad\quad\quad\quad\quad\quad\quad\quad\quad \ldots \\ \left(\sum_{i=1}^{m} x_{in}x_{i1}h_i\right)w_1 + \left(\sum_{i=1}^{m} x_{in}x_{i2}h_i\right)w_2 + \ldots + \left(\sum_{i=1}^{m} x_{in}x_{in}h_i\right)w_n = \left(\sum_{i=1}^{m} x_{in}y_ih_i\right) \end{cases} \quad (8)$$

The adder 17 stores the calculation results in the prediction-tap memory 18 in an overwrite manner.

On the other hand, the stored values of the master-data memory 20 are read and sent to the adder 19. The adder 19 reads the master data $y_i$ serving as the aimed-at pixel, and uses the master data $y_i$, the low-s/n pixels constituting the prediction tap sent from the prediction-tap generation circuit 15, and the stored values of the master-data memory 20 to execute the calculation (additions) of the summations at the right side of the normal equations (7) in the same way as in the learning apparatus shown in FIG. 2.

In these additions, the adder 19 applies a weight $h_i$ by using the error mask output from the error-mask generation circuit 85 and the pinpoint extended mask output from the pinpoint-extended-mask generation circuit 86 in the same way as the adder 17.

Therefore, the adder 19 executes the calculation (additions) of the summations serving as the multipliers of the prediction coefficients at the right side of the normal equations (8).

Then, the processing proceeds to a step S36. The controller and another unit determines whether a high-s/n pixel (not-processed pixel) which has not yet been set to an aimed-at pixel is found in the master data stored in the frame memory 11. When it is determined that such a pixel is found, the pixel is set to a new aimed-at pixel, the processing returns to the step S34, and the subsequent processes are repeated.

When the controller or another unit determines in the step S36 that a high-s/n pixel (not-processed data) which has not yet been set to an aimed-at pixel is not found in the master data stored in the frame memory, the processing proceeds to a step S37, and the calculation circuit 21 reads the stored values of the prediction-tap memory 18 or the master-data memory 20 and solves the normal equations (8) to obtain one set of prediction coefficients. This prediction-coefficient set is sent to the adaptive-processing circuit 81 and to the convergence determination circuit 87.

When the adaptive-processing circuit 81 receives the prediction-coefficient set sent from the calculation circuit 21, it uses the prediction-coefficient set to obtain the prediction value of each high-s/n pixel serving as master data stored in the frame memory 11. More specifically, the adaptive-processing circuit 81 sequentially sets each high-s/n pixel stored in the frame memory 11 to an aimed-at pixel, generates the prediction tap of the aimed-at pixel by using low-s/n pixels stored in the frame memory 13, and calculates the linear prediction equation (1) with the use of the prediction tap and the prediction-coefficient set sent from the calculation circuit 21 to obtain the prediction value of each high-s/n pixel.

The prediction value of each high-s/n pixel obtained by the adaptive-processing circuit 81 is sent to the error calculation circuit 82. In a step S39, the error calculation circuit 82 reads each high-s/n pixel (the pixel value thereof) stored in the frame memory 11, and obtains the prediction error of the prediction value against the high-s/n pixel, sent from the adaptive-processing circuit 81. The error calculation circuit 82 sends the prediction error calculated for each high-s/n pixel to the pinpoint-extended-mask generation circuit 86.

Then, the processing proceeds to a step S40, and the convergence determination circuit 87 determines whether the prediction-coefficient set which the calculation circuit 21 has calculated in the step S37 immediately before has converged. In other words, in the step S40, it is determined whether the prediction-coefficient set currently output from the calculation circuit 21 is almost the same as the prediction-coefficient set previously output from the calculation circuit 21.

When the convergence determination circuit 87 determines in the step S40 that the prediction-coefficient set output from the calculation circuit 21 has not converged, in other words, when the prediction-coefficient set currently output from the calculation circuit 21 is not almost the same as the prediction-coefficient set previously output from the calculation circuit 21, the processing proceeds to a step S41, and the controller or another unit increments the variable "j" by 1. Then, the processing proceeds to a step S42, and the controller or another unit determines whether the variable "j" is smaller than the predetermined number MAXJ of times.

When the controller or another unit determines in the step S42 that the variable "j" is smaller than the predetermined number MAXJ of times, in other words, when the number of times processing for making a prediction-coefficient set converge, that is, loop processing from the step S34 to the step S43, is executed is MAXJ or less, the processing proceeds to a step S43, and the pinpoint-extended-mask generation circuit 86 updates (changes) the pinpoint extended mask according to the prediction error sent from the error calculation circuit 82.

More specifically, when the convergence determination circuit 87 determines in the step S40 that the prediction-coefficient set sent from the calculation circuit 21 has not converged, a signal (hereinafter called a non-convergence signal, if necessary) indicating the condition is output to the pinpoint-extended-mask generation circuit 86. When the pinpoint-extended-mask generation circuit 86 receives the non-convergence signal from the convergence determination circuit 87, if the number of times the processing for making the prediction-coefficient set converge, that is, the loop processing from the step S34 to the step S43, is executed is MAXJ or less, the pinpoint-extended-mask generation circuit 86 updates the pinpoint extended mask according to the prediction error sent from the error calculation circuit 82. The updated pinpoint extended mask is sent to the adders 17 and 19.

Figure 13A:
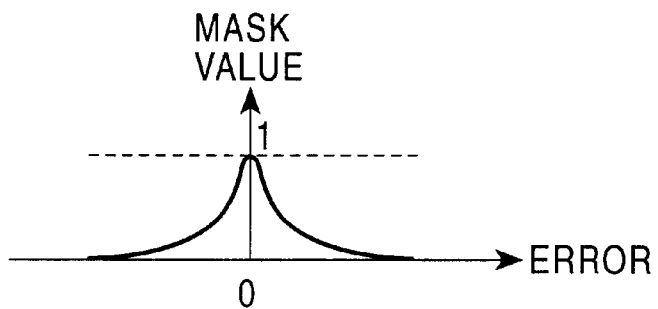
FIG. 13A is a chart showing a pinpoint extended mask used in the learning apparatus shown in FIG. 9.

FIG. 13A shows a pinpoint extended mask. As shown in FIG. 13A, the pinpoint extended mask is set to 1 when the prediction error of the prediction value of each high-s/n pixel is 0, and is set to a smaller value as the prediction error becomes larger (the absolute value thereof becomes larger as described above). In the current case, the pinpoint extended mask is, for example, similar to the curve of the function $y=1/\sqrt{|x|}$ Therefore, the pinpoint-extended-mask generation circuit 86 generates a pinpoint extended mask which gives a larger weight to a high-s/n pixel for which a prediction value having a smaller prediction error is obtained.

Back to FIG. 12, the stored values of the prediction-tap memory 18 and the master-data memory 20 are initialized, for example, to zero in the step S43. The processing returns to the step S34, and the subsequent processes are repeated. Therefore, in the subsequent additions executed by the adders 17 and 19 in the step S35, a large weight $h_i$ is given to the terms of master data (high-s/n pixel) $y_i$ for which the this-time prediction value (prediction value obtained in the step S38 immediately before) has a small prediction error and of the prediction tap $x_{ij}$ of the master data $y_i$ among terms in the equations (8). As a result, as described by referring to FIG. 11C, for master data having a small prediction error, a prediction-coefficient set which makes the error smaller (a prediction-coefficient set corresponding to the straight line L" shown in FIG. 11C) is obtained.

When the controller or another unit determines in the step S42 that the variable "j" is not smaller than the predetermined number MAXJ of times, in other words, when the number of times the processing for making the prediction-coefficient set converge for the variable "i," that is, the loop processing from the step S34 to the step S43, is executed reaches MAXJ, the processing proceeds to a step S44, and the processing described below is executed.

In the present embodiment, as described above, the processing for making the prediction-coefficient set converge, that is, the loop processing from the step S34 to the step S43, is stopped when the number of times the processing is executed reaches MAXJ even if the prediction-coefficient set does not converge. This loop processing can be executed without specifying any limitations on the number of times it is executed, until the prediction-coefficient set converges.

When the convergence determination circuit 87 determines in the step S40 that the prediction-coefficient set output from the calculation circuit 21 has converged, in other words, when the prediction-coefficient set currently output from the calculation circuit 21 is almost the same as that previously output from the calculation circuit 21, therefore, when a prediction-coefficient set which makes the prediction errors of the prediction values of a part of the master data very small is obtained, the processing proceeds to a step S44, and the convergence determination circuit 87 sends the currently output prediction-coefficient set to the coefficient storage section 88, and stores it at the address corresponding to the variable "i" serving as identification information, in the coefficient storage section 88. Then, the processing proceeds to a step S45, and the minimum prediction error of the prediction value of each high-s/n pixel is obtained.

In other words, when the convergence determination circuit 87 determines that the prediction-coefficient set has converged (also when the variable "j" is not smaller than MAXJ in the step S42), a signal (hereinafter called a convergence signal, if necessary) indicating the condition to the adaptive-processing circuit 81, to the error calculation circuit 82, to the identification-information writing circuit 84, and to the error-mask generation circuit 85.

When the adaptive-processing circuit 81 receives the convergence signal, it reads all prediction-coefficient sets which have been stored in the coefficient storage section 88, and obtains the prediction value of each high-s/n pixel by using each prediction-coefficient set in the same way as in the step S38.

Therefore, in this case, the adaptive-processing circuit 81 obtains a prediction value by using each of one prediction-coefficient set or more which have been stored in the coefficient storage section 88. As a result, when the prediction-coefficient set output from the calculation circuit 21 converges, one or more prediction value is obtained for one high-s/n pixel.

The prediction value of each high-s/n pixel, obtained by the adaptive-processing circuit 81 is sent to the error calculation circuit 82. The error calculation circuit 82 reads each high-s/n pixel (the pixel value thereof) stored in the frame memory 11, and obtains the prediction error of one or more prediction values of each high-s/n pixel, the values being sent from the adaptive-processing circuit 81. The error calculation circuit 82 sends the minimum of one or more prediction errors obtained for each high-s/n pixel to the identification-information writing circuit 84 and to the error-mask generation circuit 85.

In other words, as described above, since one or more prediction values are obtained for each high-s/n pixel, the error calculation circuit 82 sends the minimum value (hereinafter called the minimum prediction error, if necessary) of the prediction errors of the one or more prediction values for each high-s/n pixel to the identification-information writing circuit 84 and to the error-mask generation circuit 85.

The adaptive-processing circuit 81 relates each prediction-coefficient set to the identification information serving as the address where the prediction-coefficient set is stored when it reads the prediction-coefficient set which has been stored in the coefficient storage section 88, and further relates the prediction value obtained by using each prediction-coefficient set to the identification information of the prediction-coefficient set and outputs to the error calculation circuit 82.

The error calculation circuit 82 relates the minimum prediction error to the identification information of the prediction-coefficient set used to obtain the prediction value used when the minimum prediction error is obtained, and outputs them to the identification-information writing circuit 84 and to the error-mask generation circuit 85.

Therefore, the minimum prediction error of the prediction value of each high-s/n pixel is sent to the identification-information writing circuit 84 and to the error-mask generation circuit 85 together with the identification information of the prediction-coefficient set used to obtain the prediction value.

When the identification-information writing circuit 84 receives the identification information together with the minimum prediction error of the prediction value of each high-s/n pixel, it writes (overwrites) in a step S46 the identification information related to the minimum prediction error of the prediction value of the high-s/n pixel at the address corresponding to the high-s/n pixel into the identification-information storage section 83.

Therefore, when the prediction value of each high-s/n pixel is obtained by using the prediction-coefficient set specified by the identification information stored at the address corresponding to the high-s/n pixel in the identification-information storage section 83, the prediction value which currently minimizes the prediction error is obtained.

Then, the proceeding proceeds to a step S47, and the controller or another unit increments the variable "i" serving as identification information by 1. The processing proceeds to a step S48. In the step S48, the controller or another unit determines whether the variable "i" is smaller than the value MAXI specified in advance as the maximum number of prediction-coefficient sets. When the controller or another unit determines in the step S48 that the variable "i" is smaller than MAXI, in other words, when the number of prediction-coefficient sets stored in the coefficient storage section 88 is smaller than the value MAXI specified in advance, the processing proceeds to a step S49 and the error-mask generation circuit 85 updates (changes) the error mask according to the minimum prediction error sent from the error calculation circuit 82.

More specifically, when the error-mask generation circuit 85 receives the convergence signal from the convergence determination circuit 87, it updates the error mask according to the minimum prediction error sent from the error calculation circuit 82. The updated error mask is sent to the adders 17 and 19.

Figure 13B:
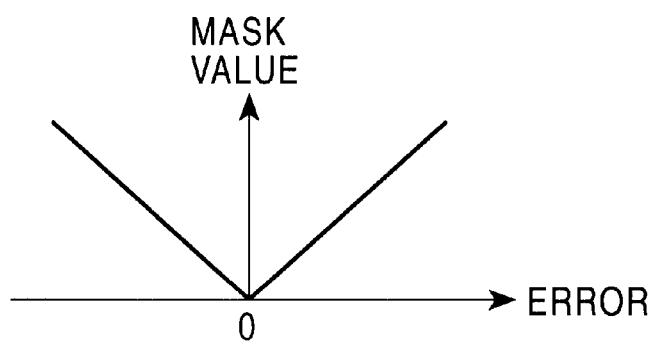
FIG. 13B is a chart showing an error mask used in the learning apparatus shown in FIG. 9.

FIG. 13B shows the error mask. As shown in FIG. 13B, the error mask is set to 0 for each high-s/n pixel when the minimum prediction error of the prediction value thereof is 0, and is set to a value proportional to the magnitude of the minimum prediction error, in other words, is set to a larger value when the magnitude of the minimum prediction error becomes larger. The error mask is almost given here, for example, by the curve of the function $y=|x|$.

Therefore, the error-mask generation circuit 85 generates an error mask which applies a larger weight to a high-s/n pixel for which a prediction value having a larger minimum prediction error is obtained.

Back to FIG. 12, in the step S49, the pinpoint extended mask is initialized, for example, to 1 in the pinpoint-extended-mask generation circuit 86, and the stored values of the prediction-tap memory 18 and the master-data memory 20 are initialized, for example, to zero. Then, the processing returns to a step S33, and the subsequent processes are repeated.

Therefore, in this case, the adders 17 and 19 execute additions with a larger weight $h_i$ being placed on terms using master data (high-s/n pixel) $y_i$ having not a small prediction error obtained even with any of the prediction-coefficient sets stored in the coefficient storage section 88 and the prediction tap $x_{ij}$ of the master data $y_i$ among all terms in the equations (8). As a result, as described by referring to FIG. 11B, for master data having not a small prediction error, a prediction-coefficient set (the prediction-coefficient set corresponding to the straight line L' shown in FIG. 11B) which makes the prediction error smaller is obtained.

On the other hand, when the controller or another unit determines in the step S48 that the variable "i" is not smaller than MAXI, in other words, when the number of prediction-coefficient sets, which is the same as the value MAXI specified in advance are stored in the coefficient storage section 88, the learning processing is terminated.

Figure 13C:
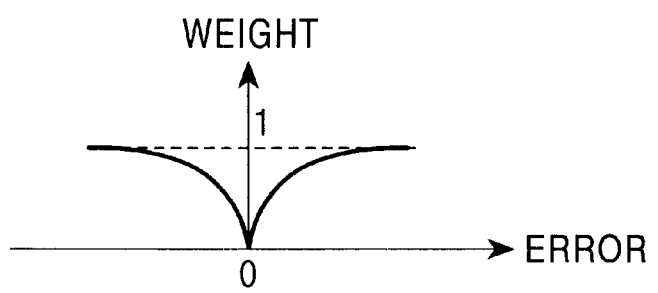
FIG. 13C is a chart showing a combined mask of the pinpoint extended mask and the error mask shown in FIGS. 13A and 13B.

The adders 17 and 19 execute the additions of prediction taps (apprentice data) and master data in the step S35, always with weights being applied by both pinpoint extended mask and error mask. The mask (the product of both masks) obtained by superposing the pinpoint extended mask shown in FIG. 13A on the error mask shown in FIG. 13B almost has the curve of the function $y=1/\sqrt{x}$ as shown in FIG. 13C. The weight $h_i$ indicated in the equations (8) is given by this curve.

Figure 14:
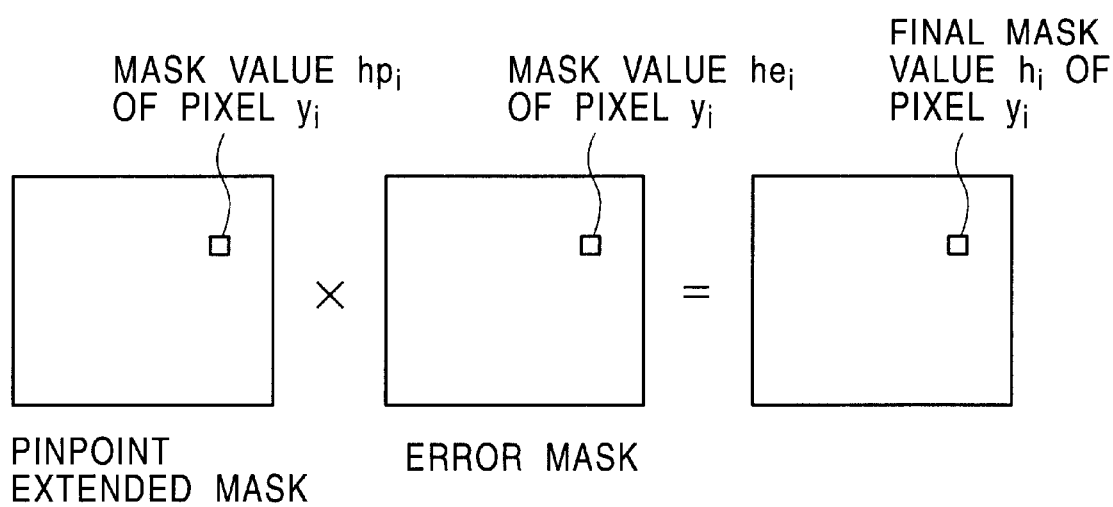
FIG. 14 is a view showing a method for generating the combined mask of the pinpoint extended mask and the error mask, shown in FIG. 13C.

More specifically, as shown in FIG. 14, when a pinpoint extended mask has the mask value hpi for a high-s/n pixel $y_i$, the mask value being obtained according to the prediction error of the pixel, and an error mask has the mask value $he_i$, which is obtained according to the minimum prediction error of the pixel, the weight (mask value) $h_i$ indicated in the equations (8) is given by hpi x $he_i$. The adders 17 and 19 obtain the weight $h_i$ for each high-s/n pixel, and use it as the weight in the additions of the prediction taps (apprentice data) and the master data.

As described above, since the learning apparatus shown in FIG. 9 applies a large weight (uses the error mask so as to apply such a weight) to a combination of master data and apprentice data for which a prediction value having a large minimum value (minimum prediction error) among the prediction errors of the prediction values obtained by using the prediction-coefficient sets which have been obtained so far, and applies, every time adaptive processing for obtaining a new prediction-coefficient set is executed, a large weight (uses the pinpoint extended mask so as to apply such a weight) to a combination of master data and apprentice data for which a prediction value having a small prediction error is obtained by using the prediction-coefficient set, to obtain prediction-coefficient sets, the prediction coefficients most appropriate for converting a low-s/n image to a high-s/n image is obtained, and by the use of such prediction coefficients, a high-s/n image is obtained from a low-s/n image.

In the present embodiment, both error mask and pinpoint extended mask are used. Either of them may be used to obtain a prediction-coefficient set.

In the learning apparatus shown in FIG. 9, the identification-information storage section 83 stores the identification information of prediction-coefficient sets used to highly precisely predict each high-s/n pixel constituting a high-s/n image serving as master data. A set of the identification information corresponding to the high-s/n pixels constituting a high-s/n image of one frame is called an identification-information image. To make a description simple, it is assumed here that a high-s/n image has the same number of pixels (same resolution) as a low-s/n image. Then, the identification information corresponding to each high-s/n pixel, constituting the identification-information image, can be related to the low-s/n pixel corresponding to the high-s/n pixel.

An image processing apparatus for executing processing for converting the low-s/n image serving as the apprentice data in the learning apparatus shown in FIG. 9 to a high-s/n image by the use of each low-s/n pixel constituting the low-s/n image and each identification information constituting the identification-information image, corresponding to the low-s/n pixel will be described below.

Figure 15:
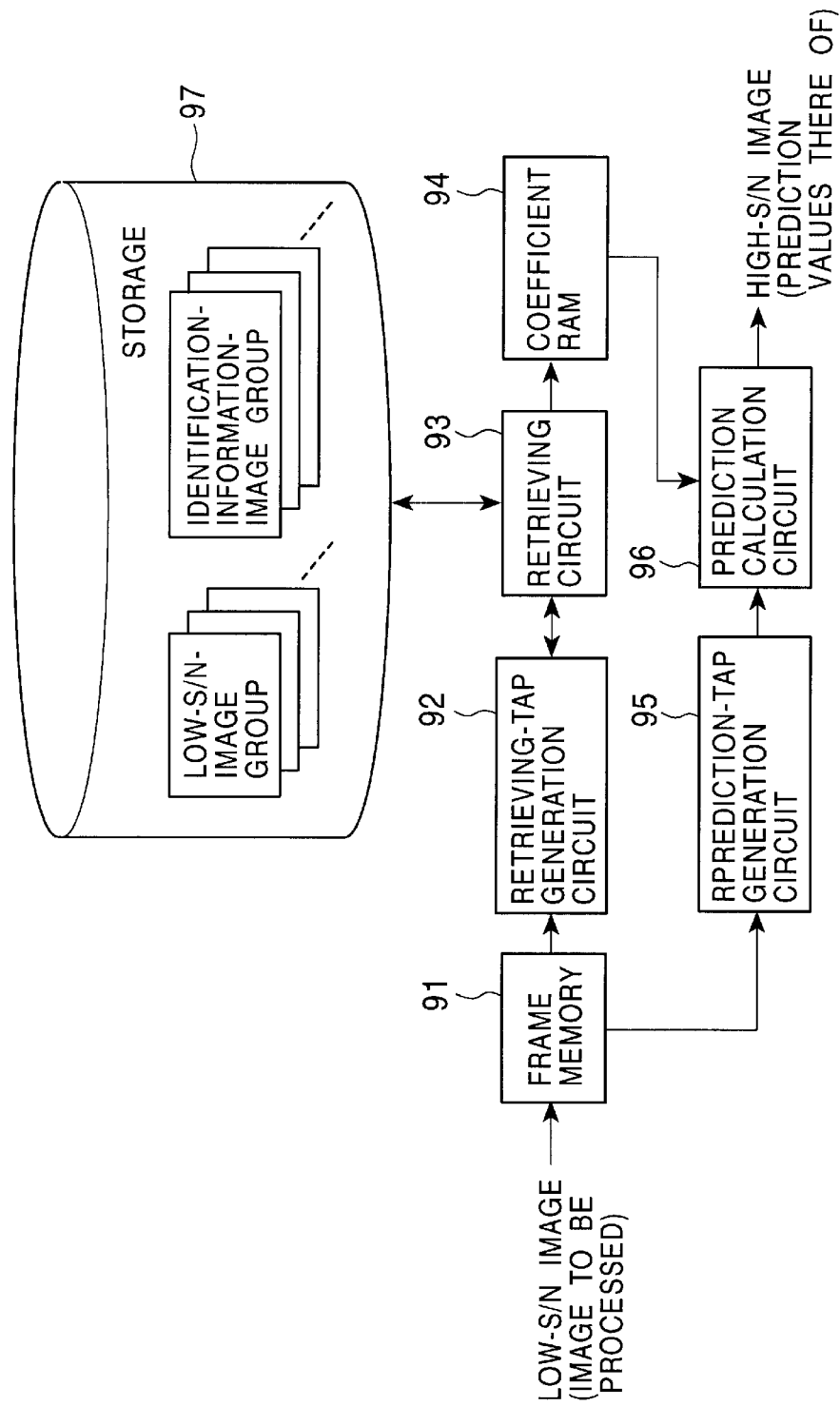
FIG. 15 is a block diagram of an image processing apparatus according to an embodiment of the present invention.

FIG. 15 shows an example structure of such an image processing apparatus.

A frame memory 91 receives the low-s/n image (hereinafter called an image to be processed, if necessary) to be converted to a high-s/n image, and stores the image to be processed, for example, in units of frames.

A retrieving-tap generation circuit 92 sequentially sets each pixel constituting the image to be processed to an aimed at pixel, and reads pixels disposed around the aimed-at pixel in a spatial or time manner in the image to be processed from the frame memory 91 to form a retrieving tap. This retrieving tap is sent to a retrieving circuit 93.

The retrieving circuit 93 searches a low-s/n-image group, which is a set of low-s/n images stored in a storage 97, for the pattern (hereinafter called the same/similar pattern, if necessary) of low-s/n pixels having the same positional relationship and the same or similar pixel values as the pixels constituting the retrieving tap output from the retrieving-tap generation circuit 92. In addition, the retrieving circuit 93 searches an identification-information-image group, which is a set of identification-information images stored in the storage 97, for the identification information related to the pixel corresponding to the aimed-at pixel in the retrieved same/similar pattern, and sends the information to a coefficient RAM 94 as an address.

The coefficient RAM 94 stores the prediction-coefficient set specified by the identification information corresponding to each address at the address. The prediction-coefficient sets stored in the coefficient RAM 94 are obtained by the learning apparatus shown in FIG. 9.

A prediction-tap generation circuit 95 reads pixels disposed around the aimed-at pixel specified by the retrieving-tap generation circuit 92 in a spatial or time manner in the image to be processed from the frame memory 91, and generates the same prediction tap as the prediction-tap generation circuit 15 in the learning apparatus shown in FIG. 9. This prediction tap is sent to a prediction calculation circuit 96.

The prediction calculation circuit 96 uses the prediction-coefficient set sent from the coefficient RAM 94 and the prediction tap sent from the prediction-tap generation circuit 95 to execute the calculation shown in the equation (1), and outputs the prediction value of the high-s/n pixel.

The storage 97 stores the identification-information-image group, which is the set of the identification-information images formed of the identification information obtained by the learning apparatus shown in FIG. 9, and the low-s/n image group, which is the set to the low-s/n images serving as the apprentice data used to obtain the identification information. Each low-s/n pixel of the low-s/n-image group is related to each identification information of the identification-information-image group, as described above.

Figure 16:
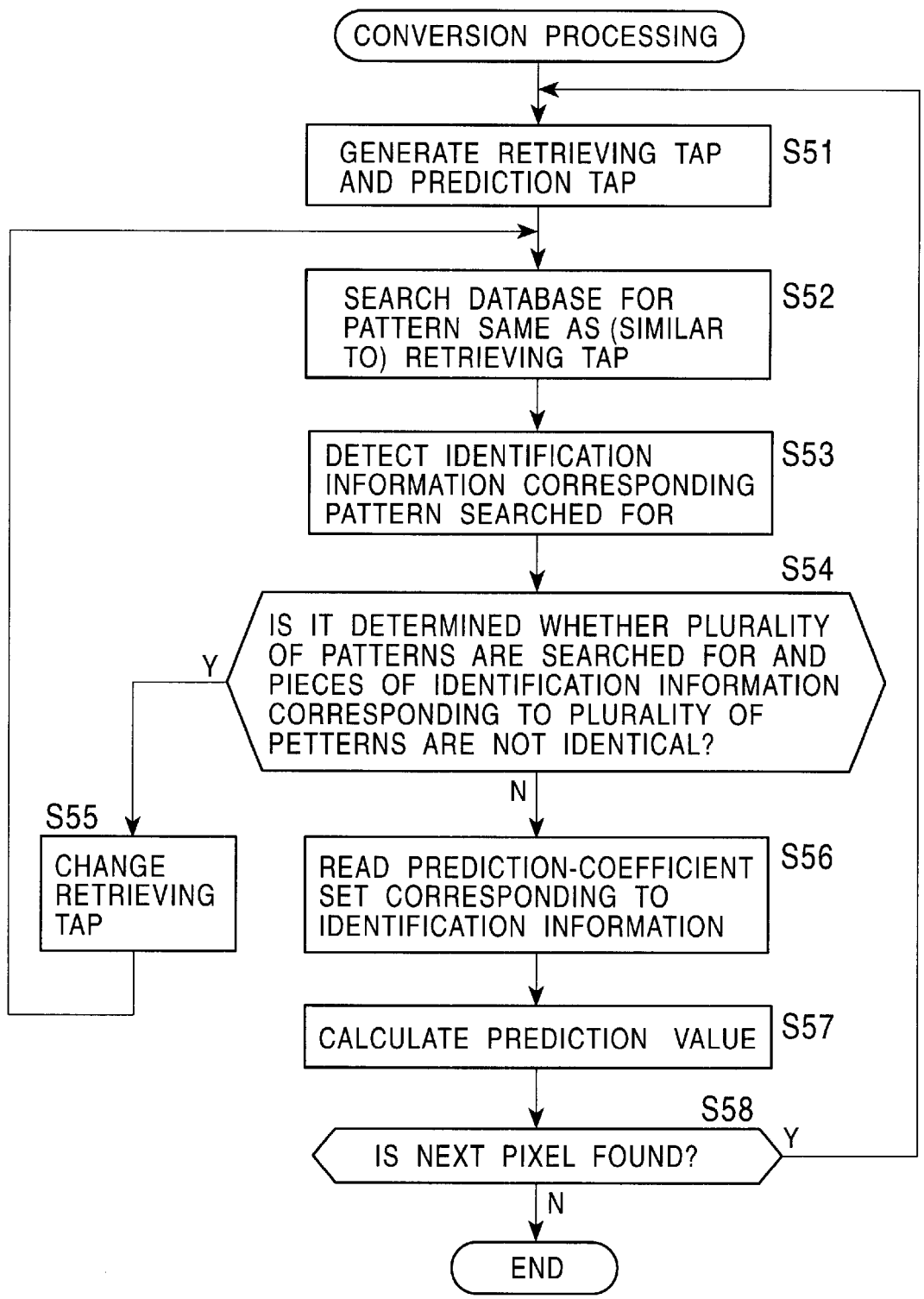
FIG. 16 is a flowchart of the processing of the image processing apparatus shown in FIG. 15.

Converting processing for converting the image to be processed to a high-s/n image having an improved s-n ratio, to be executed by the image processing apparatus shown in FIG. 15 will be described below by referring to a flowchart shown in FIG. 16.

The image to be processed is sent to the frame memory 91, for example, in units of frames.

The retrieving-tap generation circuit 92 sets a pixel constituting the image to be processed to an aimed at pixel, and reads in a step S51 pixels disposed around the aimed-at pixel in a spatial or time manner in the image to be processed from the frame memory 91 to form a retrieving tap to be compared with when the same/similar pattern is searched for. This retrieving tap is sent from the retrieving-tap generation circuit 92 to the retrieving circuit 93.

In addition, in the step S51, the prediction-tap generation circuit 95 reads the pixels disposed around the aimed-at pixel specified by the retrieving-tap generation circuit 92 in a spatial or time manner in the image to be processed from the frame memory 91, and generates the same prediction tap as the prediction-tap generation circuit 15 in the learning apparatus shown in FIG. 9. This prediction tap is sent from the prediction-tap generation circuit 95 to the prediction calculation circuit 96.

When the retrieving circuit 93 receives the retrieving tap from the retrieving-tap generation circuit 92, it searches in a step S52 the low-s/n-image group stored in the storage 97 for the same/similar pattern, which is a set of low-s/n pixels having the same positional relationship and the same or almost the same pixel values as the pixels constituting the retrieving tap, and the processing proceeds to a step S53. In the step S53, the retrieving circuit 93 searches the identification-information-image group stored in the storage 97 for the identification information related to the pixel corresponding to the aimed-at pixel in the low-s/n pixels constituting the same/similar pattern.

Not only one same/similar pattern is searched for, but a plurality of same/similar patterns may be searched for. In this case, the identification information of each of the plurality of same/similar patterns is detected in the step S53. When the plurality of pieces of identification information are not identical (any one of the plurality of pieces of the identification information differs from another piece), the addresses corresponding to the number of different pieces of the identification information are given to the coefficient RAM 94. As a result, a plurality of sets of prediction coefficients are output from the coefficient RAM 94 to the prediction calculation circuit 96. On the other hand, only one set of prediction coefficients is required for calculating the linear prediction equation (1) for an aimed-at pixel, the equation being formed of a prediction tap and the prediction coefficients, in the prediction calculation circuit 96. When a plurality of same/similar patterns are searched for and the pieces of the identification information corresponding to the plurality of same/similar patterns are not identical, it is difficult for the prediction calculation circuit 96 to calculate the linear prediction equation (1).

In a step S54, the retrieving circuit 93 determines whether a plurality of same/similar patterns are searched for and the pieces of the identification information corresponding to the plurality of same/similar patterns are not identical.

When the retrieving circuit 93 determines in the step S54 that a plurality of same/similar patterns are searched for and the pieces of the identification information corresponding to the plurality of same/similar patterns are not identical, the processing proceeds to a step S55, and the retrieving circuit 93 controls the retrieving-tap generation circuit 92 so as to change the pixels constituting the retrieving tap in the image to be processed, to form a new retrieving tap, and to output it. In this case, the retrieving-tap generation circuit 92 forms the new retrieving tap for the aimed-at pixel and sends it to the retrieving circuit 93. In other words, the retrieving-tap generation circuit 92 forms the new retrieving tap with the use of pixels different from the pixels constituting the currently used retrieving tap in the image to be processed for the aimed-at pixel. More specifically, for example, a new pixel is added to the pixels constituting the current retrieving tap or a part of the pixels constituting the current retrieving tap is replaced with other pixels to form the new retrieving tap. Then, the processing returns to the step S52, and the subsequent processes are repeatedly applied to the new retrieving tap.

When the retrieving circuit 93 determines in the step S54 that only one same/similar pattern is searched for, or even if a plurality of same/similar patterns are detected, the pieces of the identification information corresponding to the plurality of same/similar patterns are all the same, the processing proceeds to a step S56, and the retrieving circuit 93 sends the identification information of only one same/similar pattern or the identical identification information of the plurality of same/similar patterns to the coefficient RAM 94 as an address. Then, one set of prediction coefficients stored in the coefficient RAM 94 at the address corresponding to the identification information sent from the retrieving circuit 93 is read and sent to the prediction calculation circuit 96.

When the prediction calculation circuit 96 receives the prediction-coefficient set from the coefficient RAM 94, the prediction calculation circuit 96 uses the set of prediction coefficients and the prediction tap sent from the prediction-tap generation circuit 95 to calculate the equation (1), obtains the prediction value of the high-s/n pixel corresponding to the aimed-at pixel, outputs it, and the processing proceeds to a step S58.

In the step S58, the controller or another unit determines whether a pixel to be processed next is stored in the frame memory 91. When it is determined that the pixel is stored, the pixel to be processed next is set to a new aimed-at pixel, the processing proceeds to the step S51, and the subsequent processes are repeated.

When the controller or another unit determines in the step S58 that a pixel to be processed next is not stored in the frame memory 91, the processing is terminated.

As described above, since a same/similar pattern is searched for against the prediction tap formed for an aimed-at pixel, and the prediction value of the high-s/n pixel is obtained by using the prediction-coefficient set specified by the identification information related to the low-s/n pixel corresponding to the aimed-at pixel in the same/similar pattern, a high-s/n image having an improved s/n ratio is obtained only from a low-s/n image. Unlike the encoded data input to the decoder 41 shown in FIG. 7, if a low-s/n pixel is not related to the identification information of the prediction-coefficient set used to convert the low-s/n pixel to a high-s/n pixel, the low-s/n image can be converted to a high-s/n image. Therefore, the image processing apparatus shown in FIG. 15 can be used as the decoder 41 shown in FIG. 4. In this case, the encoder 41 shown in FIG. 4 needs to output only a low-s/n image as encoded data.

The series of processing described above can be implemented by hardware or software. When the series of processing is achieved by software, a program constituting the software is installed into a computer which is built in an image transfer apparatus, an image processing apparatus, or a learning apparatus serving as special hardware or into a general-purpose computer which executes various types of processing with various types of programs installed.

Media used for installing the program for executing the series of processing described above and for making it executable by the computer will be described below by referring to FIGS. 17A, 17B, and 17C.

Figure 17A:
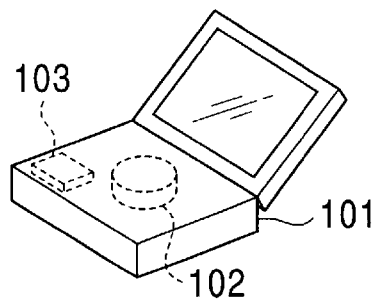
FIG. 17A is a view of a computer into which a program for executing the processing shown in the flowchart according to an embodiment of the present invention is installed.

The program can be provided for the user in a condition in which it is installed in advance into a hard disk 102 or a semiconductor memory 103 serving as a recording medium which is built in a computer 101, as shown in FIG. 17A.

Figure 17B:
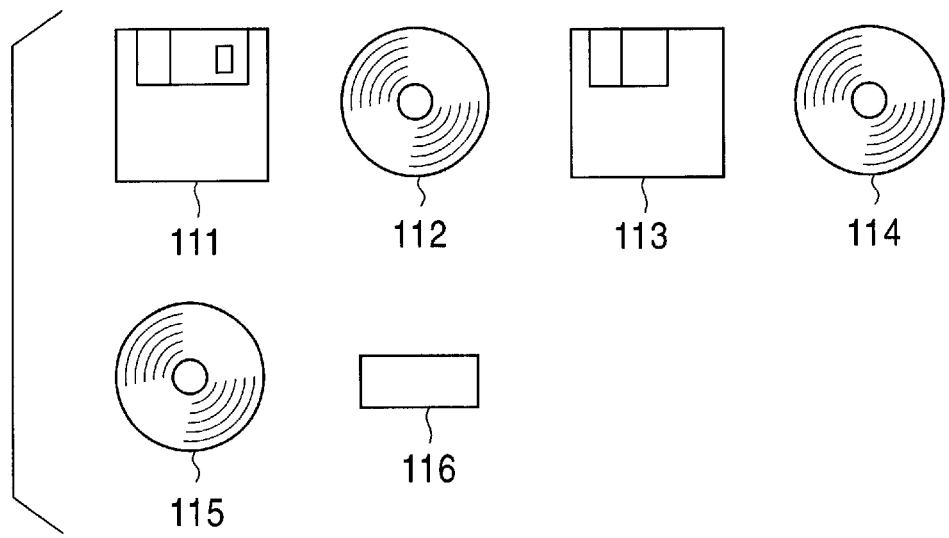
FIG. 17B is a view of storage media for storing a program for executing the processing shown in the flowchart according to an embodiment of the present invention.

Alternatively, the program is provided as package software in a condition in which it is recorded temporarily or perpetually into recording media, such as a floppy disk 111, a compact disc read-only memory (CD-ROM) 112, a magneto-optical (MO) disk 113, a digital versatile disk (DVD) 114, a magnetic disk 115, and a semiconductor memory 116, as shown in FIG. 17B.

Figure 17C:
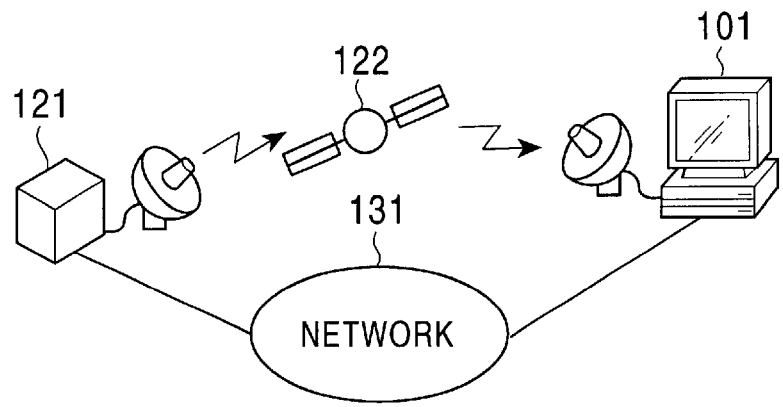
FIG. 17C is a view of transfer media for transferring a program for executing the processing shown in the flowchart according to an embodiment of the present invention.

Alternatively, the program is transferred by radio from a downloading site 121 to the computer 101 through an artificial satellite 122 for digital satellite broadcasting, or to the computer 101 by wire through a network 131 such as a local area network (LAN) or the Internet; and is installed into the hard disk 102, built in the computer 101, as shown in FIG. 17C.

The term "media" indicates a wide concept including all of the above media, in the present specification.

In the present specification, the steps describing the program provided through the media are not necessarily processed in a time sequential manner in the order in which the steps are described in the flowcharts. Processing to be executed in parallel or individually, such as parallel processing or processing by objects, is also included.

Figure 18:
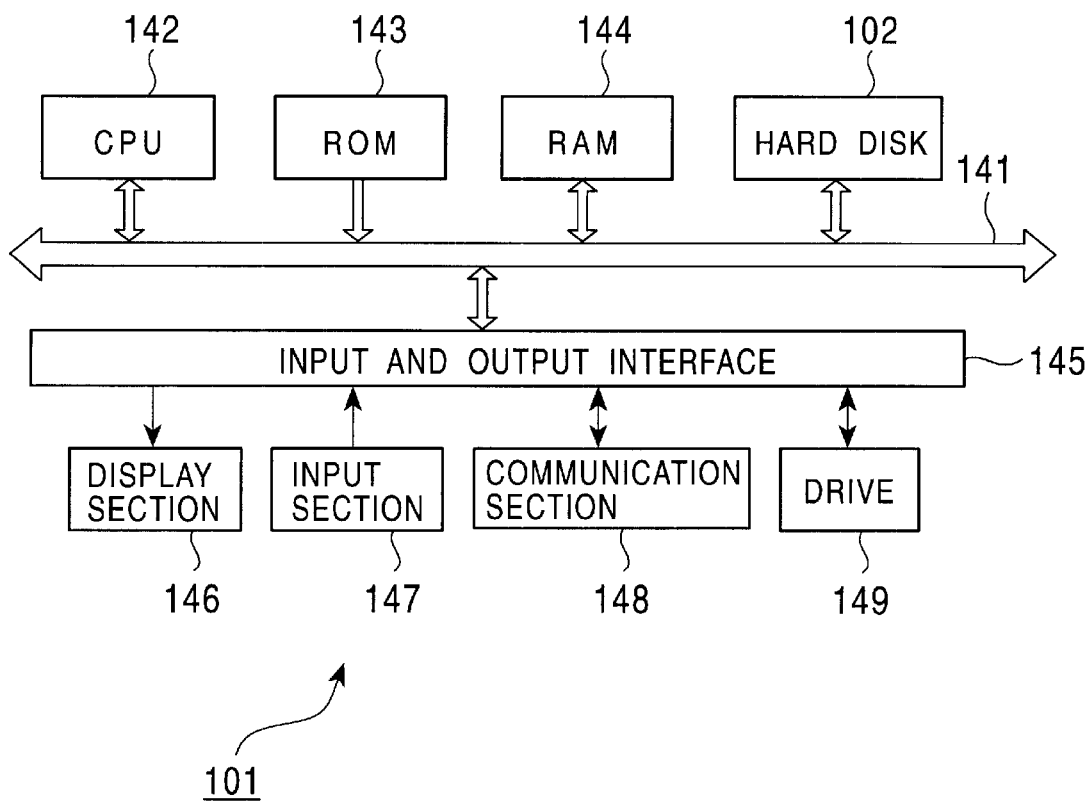
FIG. 18 is a block diagram of a computer into which a program for executing the processing shown in the flowchart according to an embodiment of the present invention can be installed.

FIG. 18 shows an example structure of the computer 101 shown in FIG. 17A.

The computer 101 includes a central processing unit (CPU) 142, as shown in FIG. 18. The CPU 142 is connected to an input and output interface 145 through a bus 141. When the user operates an input section 147 formed of a keyboard and a mouse to input a command through the input and output interface 145, the CPU 142 executes a program stored in a read-only memory (ROM) 143 corresponding to the semiconductor memory 103 shown in FIG. 17A. Alternatively, the CPU 142 loads into a random access memory (RAM) 144 a program stored in the hard disk 102; a program transferred through the satellite 122 or the network 131, received by a communication section 148, and installed into the hard disk 102; or a program read from the floppy disk 111, the CD-ROM 112, the MO disk 113, the DVD 114, or the magnetic disk 115 which is loaded into a drive 149, and installed into the hard disk 102; and executes it. The CPU 142 outputs the processing result, for example, through the input and output interface 145 to a display section 146 formed of a liquid-crystal display (LCD), as required.

In the present embodiment, images are processed. In addition to images, for example, sound can be processed.

What is claimed is:

1. A data processing apparatus for obtaining a prediction coefficient used to predict first data, from second data which has a lower quality than the first data, comprising:

prediction-data extracting means for extracting prediction data used to predict the first data, from the second data;

prediction-coefficient calculation means for obtaining a prediction-coefficient set used to predict the first data by using the first data and the prediction data to both of which a predetermined weight is applied;

prediction-value calculation means for obtaining the prediction value of the first data by using the prediction data and the prediction-coefficient set;

prediction-error calculation means for obtaining the prediction error of the prediction value against the first data; and weight changing means for changing the weight applied to the first data and to the prediction data, according to the prediction error.

2. A data processing apparatus according to claim 1, wherein said weight changing means changes the weight applied to the first data and to the prediction data used to predict the first data, such that the prediction value having a small prediction error of the first data has a smaller prediction error.

3. A data processing apparatus according to claim 2, wherein said weight changing means applies a larger weight to the first data for which the prediction value has a smaller prediction error among the first data having a small prediction error and to the prediction data used to predict the first data.

4. A data processing apparatus according to claim 1, wherein said weight changing means changes the weight applied to the first data and to the prediction data used to predict the first data, such that the prediction value having a large prediction error of the first data has a smaller prediction error, after the prediction coefficient corresponding to the first data having a small prediction error is obtained.

5. A data processing apparatus according to claim 4, wherein said weight changing means applies a larger weight to the first data having the large prediction error and to the prediction data used to predict the first data, after the prediction coefficient corresponding to the first data having the small prediction error is obtained.

6. A data processing apparatus according to claim 1, wherein said prediction-value calculation means performs linear prediction by using the prediction-coefficient set and the prediction data.

7. A data processing apparatus according to claim 6, wherein said prediction-coefficient calculation means solves a normal equation which uses the first data and the prediction data to both of which the predetermined weight is applied, to obtain the prediction-coefficient set.

8. A data processing apparatus according to claim 1, further comprising generation means for generating the second data from the first data.

9. A data processing apparatus according to claim 8, wherein said generation means generates the second data by deteriorating the first data.

10. A data processing apparatus according to claim 1, further comprising prediction-coefficient storage means for storing a plurality of prediction-coefficient sets.

11. A data processing apparatus according to claim 1, further comprising identification-information storage means for storing identification information which identifies a prediction-coefficient set which minimizes the prediction error.

12. A data processing apparatus according to claim 1, wherein the first data and the second data are image data.

13. A data processing apparatus for processing second data which has a lower quality than first data to obtain the prediction value of the first data, comprising:

prediction-data extracting means for extracting prediction data used to predict the first data, from the second data;

identification-information storage means for relating identification information used to identify a prediction-coefficient set used to predict the first data, to third data and for storing them;

comparison-data extracting means for extracting comparison data to be compared with the third data stored in said identification-information storage means, from the second data;

retrieving means for comparing the comparison data with the third data stored in said identification-information storage means to search for third data having the pattern same as or similar to the comparison data; and prediction-value calculation means for obtaining the prediction value of the first data by using the prediction data and the prediction-coefficient set identified by the identification information corresponding to the third data having the pattern same as or similar to the comparison data.

14. A data processing apparatus according to claim 13, further comprising prediction-coefficient storage means for storing a plurality of prediction-coefficient sets used to predict the first data, wherein the prediction-coefficient set corresponding to the identification information is read from said prediction-coefficient storage means.

15. A data processing apparatus according to claim 14, wherein the plurality of prediction-coefficient sets stored in said prediction-coefficient storage means are obtained by using the first data and the prediction data to both of which a predetermined weight has been applied.

16. A data processing apparatus according to claim 15, wherein the plurality of prediction-coefficient sets stored in said prediction-coefficient storage means are obtained by solving a normal equation which uses the first data and the prediction data to both of which the predetermined weight is applied.

17. A data processing apparatus according to claim 13, wherein said prediction-value calculation means executes linear prediction by using the prediction-coefficient set and the prediction data.

18. A data processing apparatus according to claim 13, wherein, when a plurality of items of the third data having the pattern same as or similar to the comparison data are found and the pieces of the identification information corresponding to the plurality of items of the third data are not identical, said comparison-data extracting means extracts a new comparison data from the second data; and said retrieving means searches for third data having the pattern same as or similar to the new comparison data.

19. A data processing apparatus according to claim 13, wherein the first data, the second data, and the third data are image data.

20. A data processing apparatus for processing first data to output second data, comprising:

prediction-data extracting means for extracting prediction data used to predict the first data, from the second data;

prediction-coefficient storage means for storing a plurality of prediction-coefficient sets used to predict the first data;

prediction-value calculation means for obtaining the prediction value of the first data by using the prediction data and a predetermined set of the plurality of prediction-coefficient sets;

prediction-error calculation means for obtaining the prediction error of the prediction value against the first data;

detecting means for detecting a set of the plurality of prediction-coefficient sets, which minimizes the prediction error;

identification-information storage means for storing identification information used to identify the set of the plurality of prediction-coefficient sets, which minimizes the prediction error; and output means for outputting the identification information together with the second data;

wherein the plurality of prediction-coefficient sets stored in said prediction-coefficient storage means are obtained by using the first data and the prediction data to both of which a predetermined weight is applied.

21. A data processing apparatus according to claim 20, wherein the plurality of prediction-coefficient sets stored in the prediction-coefficient storage means are obtained by solving normal equations which uses the first data and the prediction data to both of which the predetermined weight is applied.

22. A data processing apparatus according to claim 20, wherein said prediction-value calculation means executes linear prediction by using the prediction-coefficient set and the prediction data.

23. A data processing apparatus according to claim 20, further comprising generation means for generating the second data from the first data.

24. A data processing apparatus according to claim 23, wherein the generation means generates the second data by deteriorating the first data.

25. A data processing apparatus according to claim 20, wherein the first data and the second data are image data.

26. A data processing apparatus for processing second data which has a lower quality than first data to obtain the prediction value of the first data, comprising:
   separation means for separating the second data and identification information used to identify each of a plurality of prediction-coefficient sets, in input data;
   prediction-coefficient storage means for storing the plurality of prediction-coefficient sets;
   prediction-data extracting means for extracting prediction data used to predict the first data, from the second data; and
   prediction-value calculation means for obtaining the prediction value of the first data by using the prediction data and the set of the plurality of prediction-coefficient sets, selected according to one piece of the identification information;
   wherein the plurality of prediction-coefficient sets stored in the prediction-coefficient storage means are obtained by using the first data and the prediction data to both of which a predetermined weight is applied.

27. A data processing apparatus according to claim 26, wherein the plurality of prediction-coefficient sets stored in the prediction-coefficient storage means are obtained by solving normal equations which use the first data and the prediction data to both of which the predetermined weight is applied.

28. A data processing apparatus according to claim 26, wherein said prediction-value calculation means executes linear prediction by using the set of the plurality of prediction-coefficient sets and the prediction data.

29. A data processing apparatus according to claim 26, wherein the first data and the second data are image data.

30. A data processing apparatus comprising:
   a first unit for processing first data to output second data; and
   a second unit for processing the second data to obtain the prediction value of the first data,
   wherein said first unit comprises:
      first prediction-data extracting means for extracting prediction data used to predict the first data, from the second data;
      prediction-coefficient storage means for storing a plurality of prediction-coefficient sets used to predict the first data;
      first prediction-value calculation means for obtaining the prediction value of the first data by using the prediction data and a predetermined set of the plurality of prediction-coefficient sets;
      prediction-error calculation means for obtaining the prediction error of the prediction value against the first data;
      detecting means for detecting a set of the plurality of prediction-coefficient sets, which minimizes the prediction error;
      identification-information storage means for storing identification information used to identify the set of the plurality of prediction-coefficient sets, which minimizes the prediction error; and
      output means for outputting the identification information together with the second data,
   wherein the plurality of prediction-coefficient sets stored in the prediction-coefficient storage means are obtained by using the first data and the prediction data to both of which a predetermined weight is applied, and
   said second unit comprises:
      separation means for separating the second data and identification information used to identify each of the plurality of prediction-coefficient sets, in input data;
      second prediction-data extracting means for extracting prediction data used to predict the first data, from the second data; and
      second prediction-value calculation means for obtaining the prediction value of the first data by using the prediction data and the set of the plurality of prediction-coefficient sets, selected according to the identification information.

31. A data processing method for obtaining a prediction coefficient used to predict first data, from second data which has a lower quality than the first data, comprising:
   a step of extracting prediction data used to predict the first data, from the second data;
   a step of obtaining a prediction-coefficient set used to predict the first data by using the first data and the prediction data to both of which a predetermined weight is applied;
   a step of obtaining the prediction value of the first data by using the prediction data and the prediction-coefficient set;
   a step of obtaining the prediction error of the prediction value against the first data; and
   a step of changing the weight applied to the first data and to the prediction data, according to the prediction error.

32. A data processing method for processing second data which has a lower quality than first data to obtain the prediction value of the first data, comprising:
   a step of extracting prediction data used to predict the first data, from the second data;
   a step of relating identification information used to identify a prediction-coefficient set used to predict the first data, to third data and of storing them;
   a step of extracting comparison data to be compared with the stored third data, from the second data;
   a step of comparing the comparison data with the stored third data to search for third data having the pattern same as or similar to the comparison data; and
   a step of obtaining the prediction value of the first data by using the prediction data and the prediction-coefficient set identified by the identification information corresponding to the third data having the pattern same as or similar to the comparison data;
   wherein the prediction-coefficient set is obtained by using the first data and the prediction data to both of which a predetermined weight is applied.

33. A data processing method for processing first data to output second data, comprising:
   a step of extracting prediction data used to predict the first data, from the second data;
   a step of storing a plurality of prediction-coefficient sets used to predict the first data;
   a step of obtaining the prediction value of the first data by using the prediction data and a predetermined set of the plurality of prediction-coefficient sets;
   a step of obtaining the prediction error of the prediction value against the first data;
   a step of detecting a set of the plurality of prediction-coefficient sets, which minimizes the prediction error;
   a step of storing identification information used to identify the set of the plurality of prediction-coefficient sets, which minimizes the prediction error; and a step of outputting the identification information together with the second data;

wherein the prediction-coefficient sets are obtained by using the first data and the prediction data to both of which a predetermined weight is applied.

34. A data processing method for processing second data which has a lower quality than first data to obtain the prediction value of the first data, comprising:

a step of separating the second data and identification information used to identify each of a plurality of prediction-coefficient sets, in input data;

a step of extracting prediction data used to predict the first data, from the second data; and a step of obtaining the prediction value of the first data by using the prediction data and the set of the plurality of prediction-coefficient sets, selected according to one piece of the identification information;

wherein the prediction-coefficient sets are obtained by using the first data and the prediction data to both of which a predetermined weight is applied.

35. A medium for storing a program which obtains a prediction coefficient used to predict first data, from second data which has a lower quality than the first data, the program comprising:

a step of extracting prediction data used to predict the first data, from the second data;

a step of obtaining a prediction-coefficient set used to predict the first data by using the first data and the prediction data to both of which a predetermined weight is applied;

a step of obtaining the prediction value of the first data by using the prediction data and the prediction-coefficient set;

a step of obtaining the prediction error of the prediction value against the first data; and a step of changing the weight applied to the first data and to the prediction data, according to the prediction error.

36. A medium for storing a program which processes second data which has a lower quality than first data to obtain the prediction value of the first data, the program comprising:

a step of extracting prediction data used to predict the first data, from the second data;

a step of relating identification information used to identify a prediction-coefficient set used to predict the first data, to third data and of storing them;

a step of extracting comparison data to be compared with the stored third data, from the second data;

a step of comparing the comparison data with the stored third data to search for third data having the pattern same as or similar to the comparison data; and a step of obtaining the prediction value of the first data by using the prediction data and the prediction-coefficient set identified by the identification information corresponding to the third data having the pattern same as or similar to the comparison data;

wherein the prediction-coefficient set is obtained by using the first data and the prediction data to both of which a predetermined weight is applied.

37. A medium for storing a program which processes first data to output second data, the program comprising:

a step of extracting prediction data used to predict the first data, from the second data;

a step of storing a plurality of prediction-coefficient sets used to predict the first data;

a step of obtaining the prediction value of the first data by using the prediction data and a predetermined set of the plurality of prediction-coefficient sets;

a step of obtaining the prediction error of the prediction value against the first data;

a step of detecting a set of the plurality of prediction-coefficient sets, which minimizes the prediction error;

a step of storing identification information used to identify the set of the plurality of prediction-coefficient sets, which minimizes the prediction error; and a step of outputting the identification information together with the second data;

wherein the prediction-coefficient sets are obtained by using the first data and the prediction data to both of which a predetermined weight is applied.

38. A medium for storing a program which processes second data which has a lower quality than first data to obtain the prediction value of the first data, the program comprising:

a step of separating the second data and identification information used to identify each of a plurality of prediction-coefficient sets, in input data;

a step of extracting prediction data used to predict the first data, from the second data; and a step of obtaining the prediction value of the first data by using the prediction data and the set of the plurality of prediction-coefficient sets, selected according to one piece of the identification information;

wherein the prediction-coefficient sets are obtained by using the first data and the prediction data to both of which a predetermined weight is applied.

* * * * *